United States Patent
Winter et al.

(10) Patent No.: US 11,884,348 B2
(45) Date of Patent: Jan. 30, 2024

(54) ROLL STABILIZATION APPARATUS FOR TWO-WHEELED VEHICLES

(71) Applicant: Massachusetts Institute of Technology, Cambridge, MA (US)

(72) Inventors: Amos G. Winter, Somerville, MA (US); Guillermo Fabian Diaz Lankenau, Cambridge, MA (US); Lea Daigle, Cambridge, MA (US); Patrick Tornes, Pensacola, FL (US); Eric Koch, Kansas City, MO (US); Samuel Ihns, Cambridge, MA (US); Jana Saadi, Hawthorne, NJ (US); Jessica Wu, Norwell, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 158 days.

(21) Appl. No.: 17/608,299

(22) PCT Filed: May 4, 2020

(86) PCT No.: PCT/US2020/031380
§ 371 (c)(1),
(2) Date: Nov. 2, 2021

(87) PCT Pub. No.: WO2020/223736
PCT Pub. Date: Nov. 5, 2020

(65) Prior Publication Data
US 2022/0250700 A1    Aug. 11, 2022

Related U.S. Application Data

(60) Provisional application No. 62/842,122, filed on May 2, 2019.

(51) Int. Cl.
    *B62H 1/12*    (2006.01)
    *B62J 25/06*   (2020.01)
    *B62H 1/14*    (2006.01)

(52) U.S. Cl.
    CPC ............... *B62H 1/12* (2013.01); *B62H 1/14* (2013.01); *B62J 25/06* (2020.02)

(58) Field of Classification Search
    CPC ..... B62H 1/10; B62H 1/12; B62H 1/14; B62J 25/06
    See application file for complete search history.

(56) References Cited

U.S. PATENT DOCUMENTS 2,835,499 A    5/1958    Claes et al.
4,203,500 A    5/1980    Kamiya
(Continued)

FOREIGN PATENT DOCUMENTS

| FR | 2755933 A1 * | 5/1998 | ............... B62H 1/12 |
| GB | 186980 A | 10/1922 | |
| KR | 20120027625 A * | 3/2012 | ............... B62H 1/12 |

OTHER PUBLICATIONS

Grava, Sigurd, 2003. "Urban transportation systems: Choices for communities." McGraw-Hill Companies.
(Continued)

*Primary Examiner* — Kevin Hurley
*Assistant Examiner* — Hosam Shabara
(74) *Attorney, Agent, or Firm* — Barnes & Thornburg LLP

(57) ABSTRACT

A balance board coupled to a two-wheeled vehicle to provide a moving platform that an operator of the vehicle can use to stabilize the vehicle. The balance board includes a coupling mechanism, a frame, one or more moving elements, and one or more foot support pedals. In one example, the balance board is mechanically passive such that the
(Continued)

balance board maintains contact with the ground surface without an externally applied force (e.g., by the operator/user of the vehicle). In one aspect, the balance board may be rotatable about multiple rotational degrees of freedom to allow the balance board to steer as the vehicle turns.

25 Claims, 24 Drawing Sheets

(56) References Cited

U.S. PATENT DOCUMENTS

| | | | |
|---|---|---|---|
| 4,826,194 | A | 5/1989 | Sakita |
| 5,029,894 | A | 7/1991 | Willman |
| 5,064,213 | A | 11/1991 | Storch |
| 6,296,266 | B1 | 10/2001 | Martin |
| 7,914,033 | B2 | 3/2011 | Nethery |
| 11,505,237 | B2 * | 11/2022 | Cai ................... B62K 5/027 |
| 2004/0195800 | A1 | 10/2004 | Mullins |
| 2006/0108159 | A1 | 5/2006 | Jansson et al. |
| 2009/0250899 | A1 | 10/2009 | Nethery |
| 2010/0274445 | A1 * | 10/2010 | Haynes ................ B62H 1/12 180/209 |
| 2011/0042918 | A1 | 2/2011 | Tsai |

OTHER PUBLICATIONS

Guillermo F. Diaz Lankenau and Amos G. Winter V, 2018. "An engineering review of the farm tractor's evolution to a dominant design." ASME Journal of Mechanical Design. doi:10.1115/DETC2018-86285.

Haworth, N, 2008. "Powered two wheelers in a changing world—challenges and opportunities." Accident Analysis and Prevention, 44, pp. 12-18.

Hiroki Furuichi, Jian Huang, Toshio Fukuda, Takayuki Matsuno, 2014. "Switching dynamic modeling and driving stability analysis of three-wheeled narrow tilting vehicle." IEEE/ASME Transactions on Mechatron-ics, vol. 19, No. 4, August.

International Preliminary Report on Patentability for PCT/US2020/031380, dated Aug. 3, 2020.

International Search Report and Written Opinion issued for PCT/2020/031380, dated Aug. 3, 2020.

Jigneshsinh Sindha, Basab Chakraborty, Debashish Chakravarty, 2018. "Simulation based trajectory analysis for the tilt controlled high speed narrow track three wheeler vehicle." Proceedings of the ASME IDETC in Quebec, Canada. DETC2018-85087.

Johan Berote, Jos Darling, Andrew Plummer, 2015. "Lateral dynamics simulations of a three-wheeled tilting vehicle." Journal of Automotive Engineering vol. 229(3) 342-356. DOI: 10.1177/0954407014542625.

Johannes Edelmann, Manfred Plöchl, Peter Lugner, 2011. "Modelling and analysis of the dynamics of a tilting three-wheeled vehicle." Multibody System Dynamics 26:469-487. DOI 10.1007/s11044-011-9258-7.

Lankenau et al., "Design of a Human-Powered Roll Stabilization Attachment for Utilitarian Two-Wheeled Vehicles," ASME 2019 International Design Engineering Technical Conferences & Computers and Information in Engineering Conference, 2019.

Ogunrinola, I. O., 2011. "Informal self-employment and poverty alleviation: Empirical evidence from motorcycle taxi riders in nigeria." Journal of Economics and Finance, 3.

Ryosuke Oshima, Atsushi Fukuda, Tuenjai Fukuda, Thaned Satiennam, 2007. "Study on regulation of motorcycle taxi service in bangkok." Journal of the Eastern Asia Society for Transportation Studies, pp. 12-18.

S. A. Staggenborg, R. K. Taylor, L. D. Maddux, 2004. "Effect of planter speed and seed firmers on corn stand establishment." American Society of Agricultural and Biological Engineers, 20(5), pp. 573-580.

W. Van Muysen, G. Govers, K. Van Oost, and A. Van Rompaey, 2000. "The effect of tillage depth, tillage speed, and soil condition on chisel tillage erosivity." Journal of Soil and Water Conservation, 55, pp. 355-364.

William S Kisaalita, Josephat Sentongo-Kibalama, 2007. "Delivery of urban transport in developing countries: the case for the motorcycle taxi service (boda-boda) operators of kampala." Journal of Development South Africa.

World Health Organization (WHO), 2013. "Status report on road safety." Journal of Agricultural Mechanization Research.

Xia Hong-mei, Zhao Na, Li Zhi-wei , 2008. "Discussion of key technologies for applying motorcycle on light-duty agriculture power machines." http://www.who.int/.

Xia Hong-mei, Zhao Na, Li Zhi-wei, "Application of Motorcycle Techniques for Developing Light-Duty Agriculture Power Machines," ASABE Annual International Meeting, Jun. 2007.

* cited by examiner

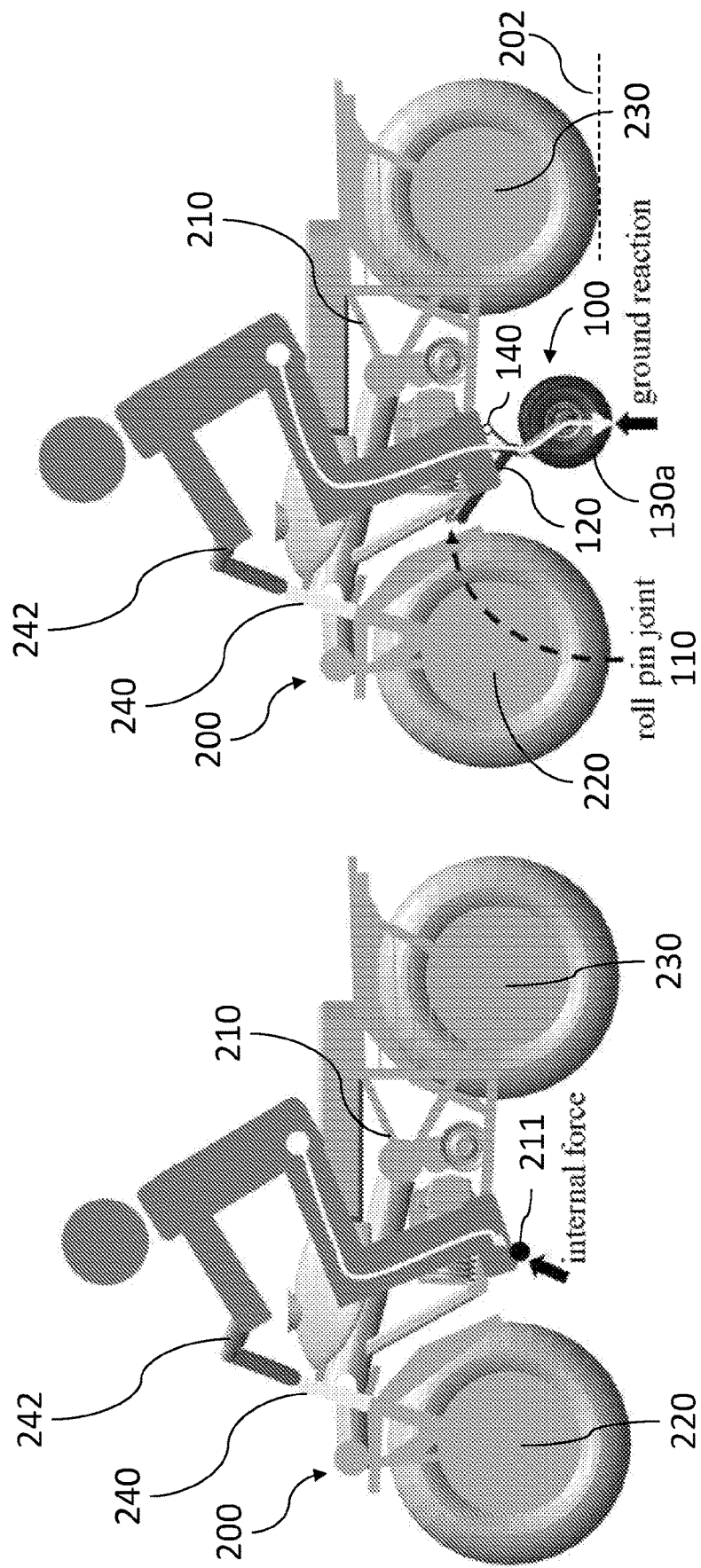

| All Wheel Drive Utility Motorcycle ||
|---|---|
| Base Vehicle | ROKON Scout |
| Mass | 125kg |
| Mass supported by front wheel | 60kg |
| Mass supported by rear wheel | 65kg |
| Wheelbase | 1.3m |
| Tire pressure | 10psi |
| Tire model | TITAN 489XT |
| Tire size | 12" rim, 8" wide, 25" diam. |
| Balance Board ||
| Mass | 8kg |
| Overall width | 0.6m |
| Distance mount to board axle | 0.3m |
| Distance rear axle to mount | 0.9m |
| Tire size | 2" wide, 8" diam. |

FIG. 6

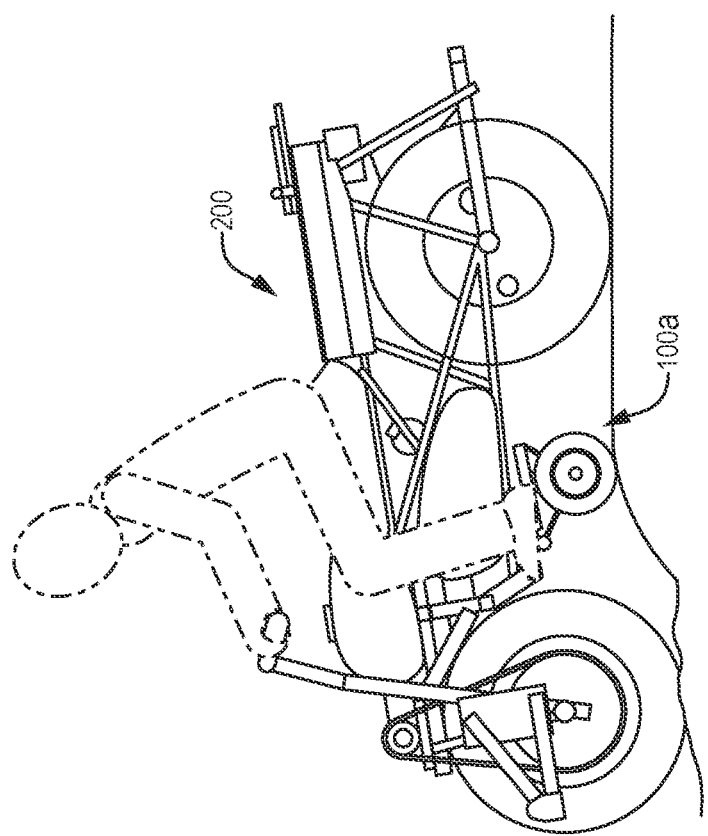

ROLL STABILIZATION APPARATUS FOR TWO-WHEELED VEHICLES

CROSS-REFERENCE TO RELATED PATENT APPLICATION(S)

This application is a U.S. national counterpart application of international application serial No. PCT/US2020/045172 filed Aug. 6, 2020, which claims priority to U.S. Provisional Patent Application No. 62/842,122, filed on May 2, 2019, the disclosures of which are hereby expressly incorporated by reference in their entireties.

BACKGROUND

The majority of farms throughout the world (84%) are less than 2 hectares (ha) in size. For example, small farms are particularly common in India where the average size of a farm has steadily decreased from 2.28 ha in 1971 to 1.08 ha in 2016. Small farmers typically use a pair of bullocks (i.e., a bull, an ox) for most, if not all, their farming operations, supplementing the remaining farming operations with pure manual labor or a hired tractor (e.g., for primary and secondary tillage). Bullocks are compact, highly maneuverable, and have a low capital cost, thus making them well-suited for the technical and economic constraints of small farms.

Conventional tractors, which are an icon of modern farming and typically associated with high farm yields, have not gained wide adoption by small farmers due, in part, to the misalignment between the design and application of a conventional tractor and the technical constraints imposed by small farms. For instance, conventional tractors are typically designed for larger farm holdings. The conventional tractor largely found its form in the United States of America (USA) between 1910 and 1940, where the annual average farm size since 1900 has been at least 50 times greater than the present global average farm size. At present, however, 72% of the farms worldwide are less than 1 ha while less than 2% of the farms in the USA farms have been less than 1 ha since 1900.

A typical conventional tractor has a low ground clearance and a large width. If a small farmer were to replace their bullocks with a conventional tractor, the farmer should adjust the crop spacing, particularly for crops that are taller than the tractor's ground clearance, and/or sacrifice farmland as headland area to give the tractor sufficient space to maneuver at the ends of each row of crops to accommodate the tractor. Small farmers may also have to invest capital to improve road access to their field due, in part, to the tractor's larger size and its poor off-road capabilities. For at least these reasons, conventional tractors are impractical for small farmers. As a result, small farmers have been largely constrained to the slow speed of bullocks and/or lack access to modern tools that are made for conventional tractors.

In recent years, there have been attempts to mechanize small farms. One example is to use a modified motorcycle as an alternative to draft animals in agricultural settings that are difficult to access for four-wheeled vehicles and/or impractical for conventional farm tractors due to size and cost. A motorcycle is a relatively affordable motorized vehicle and is the most owned vehicle type for most of the world's population. Approximately 80% of the world's motorcycles are located in Asia. China and India alone have around 200 million motorcycles. Additionally, the number of motorcycles in the world is growing at a faster rate than that of cars. This is due, in part, to the small dimensions and the agility of motorcycles, which enables operation in places where a car cannot, such as confined, narrow spaces. Furthermore, it is typically easier for a new user to learn how to operate a motorcycle than a car, particularly if the user is already able to ride a bicycle.

Compared to tractors, a motorcycle is closer to a bullock in terms of dimensions. This allows a motorcycle to potentially fit between rows of tall crops and perform tighter turns using potentially less space. However, most farming operations are performed at speeds below 4 km/h which, when compounded with the irregular field terrain, makes it difficult for a user to balance a conventional motorcycle. As a result, farmers typically drag their feet on the ground surface to balance the motorcycle when riding at low speed, which may be tiresome, allows an undesirable amount of vehicle roll, and may injure the farmer's feet.

One approach to improve the stability of a motorcycle is to replace one of wheels (i.e., the front wheel or the rear wheel) with a two-wheeled assembly. For example, FIG. 1A shows a motorcycle 10a modified in India to function as a transport vehicle. FIG. 1B shows another example of a motorcycle 10b modified in India to function as a farm tractor. As shown, the motorcycles 10a and 10b were modified to have a total of three wheels via a two-wheeled rigid rear axle. Compared to a conventional two-wheeled motorcycle, the modified motorcycles 10a and 10b are statically stable (i.e., the vehicle remains upright when stationary).

Other approaches to improve the stability of a conventional two-wheeled motorcycle have also been previously demonstrated using two ground contact supports. For example, U.S. Pat. No. 7,914,033 discloses an apparatus that utilizes an arm, rotatably attached to the front of the motorcycle chassis, that extends rearward alongside the chassis and holds an idle wheel with no steering functionality. The apparatus includes a sprung mechanism that positions the idle wheel above the ground. To stabilize the vehicle, a user should press down onto the apparatus so that the wheel contacts the ground. In another example, U.S. Pat. No. 2,835,499 discloses articulated skis coupled to a motorcycle. Similar to the apparatus of U.S. Pat. No. 7,914,033, the articulated skis include a spring mechanism that positions the skis above the ground. A user should thus press down onto the skis so that the skis contact the ground. In another example, U.S. Pat. No. 6,296,266 discloses training wheels that are rigidly coupled to the chassis of the motorcycle. The training wheels hold the motorcycle in an upright, vertical orientation with respect to the ground and further prevent the motorcycle from leaning. In another example, U.S. Pat. No. 5,029,894 discloses retractable side wheels with no steering functionality that are lowered or raised using a hydraulic actuation mechanism. A hydraulic pump should be actively operated to adjust the height of the side wheels.

SUMMARY

The Inventors have recognized and appreciated the compact size of a motorcycle (also referred to herein as a "two-wheeled vehicle" or a "vehicle) provides greater maneuverability through confined spaces. However, motorcycles typically lack roll stability compared to statically stable vehicles (e.g., a three-wheeled vehicle, a four-wheeled vehicle) particularly when traveling at slow speeds or when making tight turns. Despite previous demonstrations to improve the roll stability of motorcycles, the Inventors have recognized these previous demonstrations are deficient in several ways.

Previous approaches that replace the front wheel or the rear wheel with a two-wheeled assembly (e.g., motorcycles 10a and 10b) negates several benefits of a stock, unmodified motorcycle. First, the overall width of the modified motorcycle with a two-wheeled front or rear assembly is larger than the stock motorcycle thus preventing the motorcycle from fitting into tight spaces (e.g., the rows of crops in a small farm). Second, the motorcycles 10a and 10b are no longer able to lean, which affects the roll stability of the modified motorcycles when making a turn. Additionally, previous approaches that use two ground contact supports typically include a wheel or a ski that is unable to steer as the vehicle turns, prevents the vehicle from leaning, and/or does not contact the ground without a user actively applying force.

The present disclosure is thus directed to various inventive implementations of a mechanically passive balance board for a two-wheeled vehicle that does not increase the overall size of the vehicle and also turns as the vehicle turns. The balance board may generally include a coupling mechanism to couple the balance board to a chassis of the vehicle, one or more frames, one or more foot support pedals for a user to press against to stabilize the roll of the vehicle, and one or more moving elements (e.g., a wheel, a ski) that contacts the ground surface (hereafter simply "the ground") underneath and supporting the vehicle. In example implementations, the balance board may be disposed between a front wheel and a rear wheel of the vehicle and located below the chassis.

In one aspect, the balance board may be shaped and/or dimensioned such that the vehicle is able to navigate narrow, confined spaces and/or perform the same maneuvers as a stock vehicle with no balance board. For example, the overall width of the balance board (e.g., defined between the outer edges of respective wheels on the balance board) may be constrained to be less than a corresponding width of the handlebars of the vehicle. In some implementations, the overall width of the balance board may be less than about 0.5 m.

In another aspect, the balance board may be mechanically passive, meaning that the moving elements of the balance board maintain physical contact with the ground without an externally applied force (e.g., a user applied force). The balance board may be further coupled to the vehicle chassis (e.g., via a ball joint, or via one or more pin joints) such that the balance board remains essentially parallel with the ground as the vehicle leans to either side, such as when the vehicle is turning. Thus, the balance board may provide a platform that moves with the vehicle for a user to impart a force (e.g., via their leg/foot) that is then reacted by the ground in order to stabilize the roll of the vehicle. In other words, the balance board provides a mechanism that relies upon user physical effort to stabilize the vehicle. In this manner, the user does not have to place and/or drag their foot along the ground to stabilize the vehicle, reducing the risk of user fatigue and/or injury.

In another aspect, the balance board may be rotatable about multiple rotational degrees of freedom (DOF) with respect to the vehicle chassis. For example, the balance board may be coupled to the chassis via a ball joint, which provides three rotational DOF, or multiple pin joints where each pin joint provides a single rotational DOF. By providing a sufficient number of rotational DOF, the balance board may turn and/or otherwise steer as the vehicle turns. Said in another way, the rotational DOFs enable the moving elements of the balance board to turn in a manner that does not hinder the movement of the vehicle. For example, the wheels of a balance board may continue to roll along the ground without sliding laterally during a turn.

In another aspect, the balance board may be detachable/attachable to the vehicle so that a user may readily reconfigure the vehicle to operate with the balance board or as a stock, unmodified vehicle (i.e. without the balance board). The balance board may be sufficiently small and/or lightweight to be carried on the vehicle when not in use. The balance board may also be readily retrofit onto existing two-wheeled vehicles.

The balance board may be suited for agricultural applications by providing a roll stabilization mechanism that preserves the narrow dimensions of the vehicle and, hence, the ability of the vehicle to make tight turns. Additionally, the balance board may be coupled to the vehicle chassis in a manner that allows the balance board to ride along uneven terrain. In some implementations, the balance board may also include a ski (in addition a wheel) to ride along the surface of soft terrain (e.g., a field, snow).

However, it should be appreciated the balance board is not limited to agricultural applications, but may be applied to vehicles operating in different environments where the vehicle operates at slow speeds, but should still maintain small overall dimensions, high maneuverability, and the ability to lean during turns at high speeds. For example, the balance board may be used for vehicles operating in urban environments (e.g., a city, a highway) where the balance board allows the user to stabilize the vehicle in slow speed and/or tight turns while allowing the vehicle to lean during high speed turns. For instance, the balance board may be coupled to a police motorcycle that patrols areas with appreciable pedestrian traffic. In another example, the balance board may be used to stabilize a vehicle traversing adverse road conditions, such as wet, icy, and/or snowy roads.

In one exemplary implementation, a vehicle to be operated by a user includes a chassis, a front wheel rotatably coupled to the chassis to facilitate movement of the vehicle over a ground surface, a rear wheel rotatably coupled to the chassis to further facilitate the movement of the vehicle over the ground surface, and a balance board disposed between the front wheel and the rear wheel and coupled to the chassis such that the balance board maintains contact with the ground surface, without an applied force to the balance board by the user, when the chassis rotates with respect to the ground surface about a longitudinal axis of the vehicle.

In another exemplary implementation, a vehicle includes a chassis, a front wheel rotatably coupled to the chassis to facilitate movement of the vehicle over a ground surface, a rear wheel rotatably coupled to the chassis to further facilitate the movement of the vehicle over the ground surface, and a balance board disposed between the front wheel and the rear wheel and coupled to the chassis. The balance board includes at least one moving element that physically contacts the ground surface where the at least one moving element rotates substantially independently with respect to the chassis about a steering axis when the vehicle turns.

In another exemplary implementation, a balance board includes a coupling mechanism to couple the balance board to a chassis of a vehicle, at least one frame coupled to the coupling mechanism, a first foot support assembly coupled to the coupling mechanism, and a second foot support assembly coupled to the coupling mechanism. The first foot support assembly includes a first foot support pedal coupled to the at least one frame and a first moving element, coupled to the at least one frame, that physically contacts a ground surface supporting the balance board. The second foot support assembly includes a second foot support pedal coupled to the at least one frame and a second moving element, coupled to the at least one frame, that physically contacts the ground surface. The balance board is shaped and dimensioned to fit below the chassis and disposed between a front wheel and a rear wheel of the vehicle and a width of the balance board is less than about 0.5 m.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A shows a side view of an exemplary conventional vehicle and a representative force flow path.

FIG. 2B shows 1) a side view of a vehicle similar to that shown in FIG. 2A that is modified to include a balance board according to the inventive concepts disclosed herein, and 2) a representative force flow path of the modified vehicle.

FIG. 6 shows a table of various dimensions and properties of an exemplary two-wheeled vehicle and inventive balance board used for experimental tests.

FIG. 9C shows a photograph of the vehicle with the inventive balance board of FIG. 3A going down curbs in a variable terrain.

DETAILED DESCRIPTION

Figure 1A:
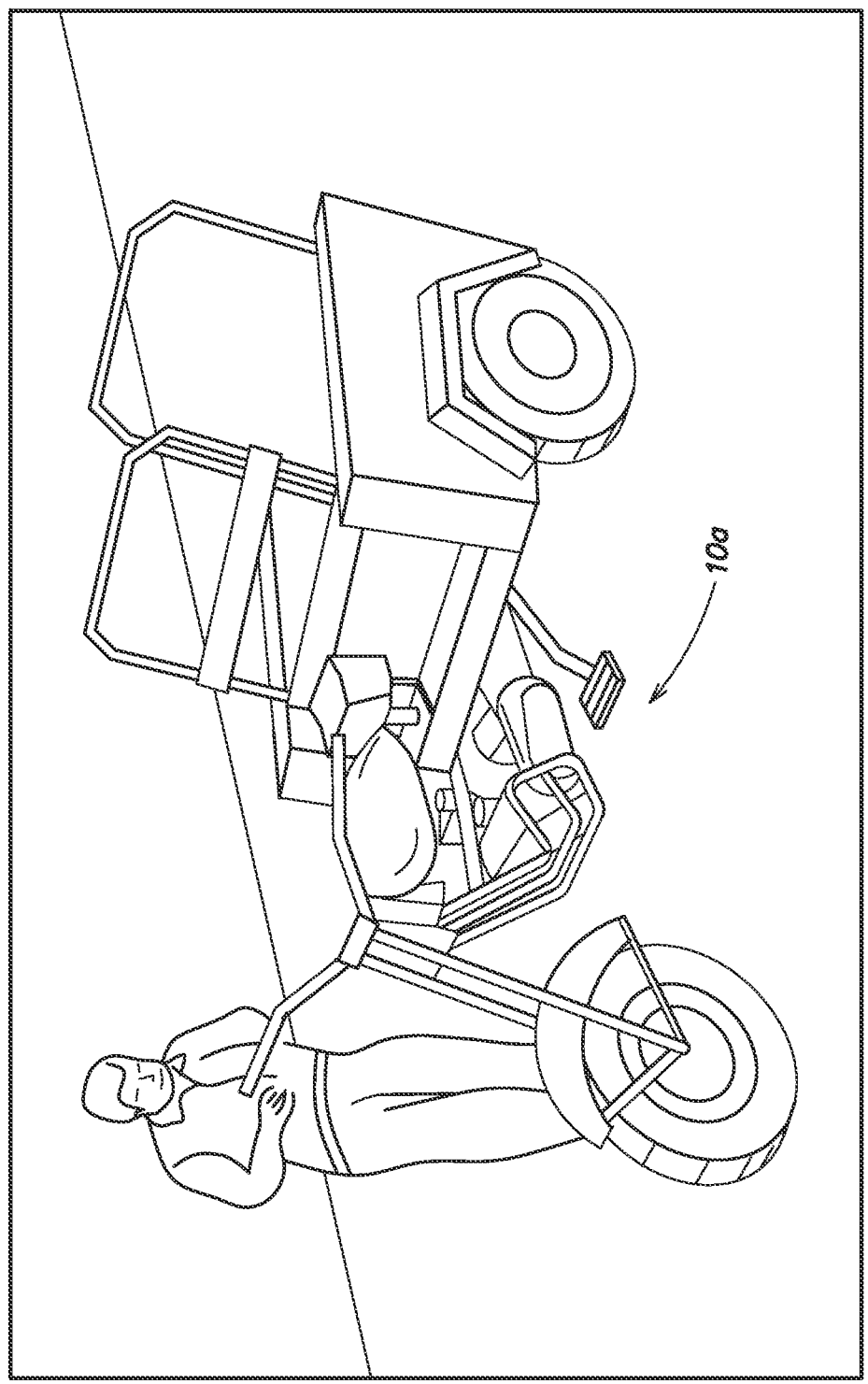
FIG. 1A shows an example of a conventional motorcycle modified to be statically stable for transportation applications.
Figure 1B:
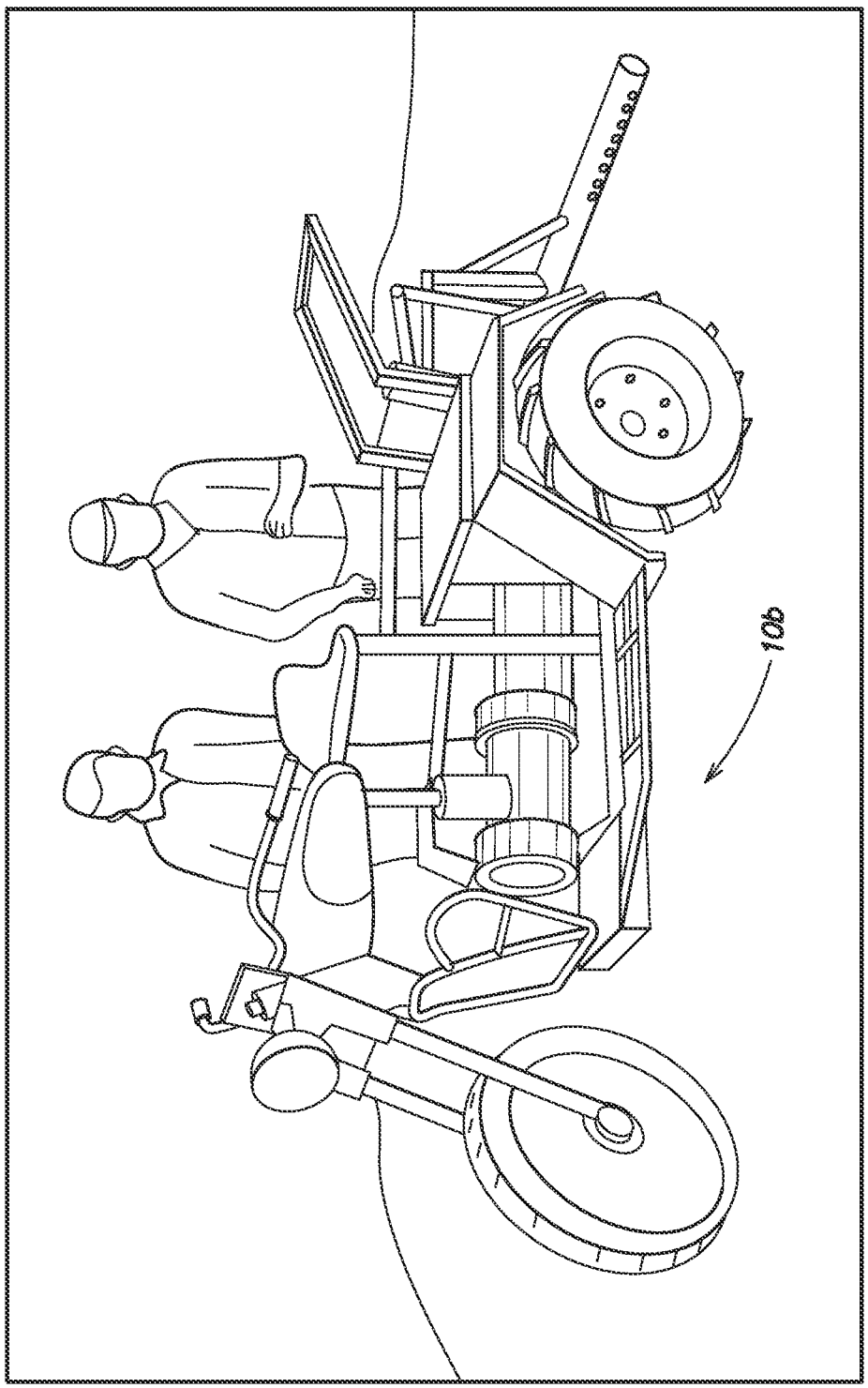
FIG. 1B shows an example of a conventional motorcycle modified to be statically stable for farming applications.

Following below are more detailed descriptions of various concepts related to, and implementations of, a balance board for a two-wheeled vehicle to provide a passive, human-powered roll stabilization mechanism that enables the vehicle equipped with the balance board to operate in relatively confined spaces (e.g., such as a farm or an urban setting). It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive balance boards are provided, wherein a given example or set of examples showcases one or more particular features of a moving element (e.g., a wheel, a ski), a frame, and a coupling mechanism with various constraints on the degrees of freedom. It should be appreciated that one or more features discussed in connection with a given example of a balance board may be employed in other examples of balance boards according to the present disclosure, such that the various features disclosed herein may be readily combined in a given balance board according to the present disclosure (provided that respective features are not mutually inconsistent).

1. Overview of a Balance Board for a Two-Wheeled Vehicle

The balance board provides a moving platform located below a vehicle for a user (also referred to herein as a "rider" or "operator") to apply a force to stabilize the vehicle. In this manner, the user does not have to place their foot onto the ground supporting the vehicle to balance the vehicle, thus providing greater comfort to the user as well as reducing any risks of injury caused by dragging the user's foot on the ground.

FIGS. 2A and 2B facilitate a general explanation of the basic operating principle of the balance board. FIG. 2A shows a vehicle 200 without a balance board 100. As shown, the vehicle 200 includes a chassis 210, a front wheel 220 that is rotatably coupled to the chassis 210 via a steering column 240, and a rear wheel 230 coupled to the chassis 210. Additionally, the vehicle 200 may include handlebars 242 coupled to the steering column 240.

When a user operates the vehicle 200 without the balance board 100, the user's foot may rest on a foot peg 211 coupled to the chassis 210. If the user applies a force via their foot, the force goes through the rigid chassis 210 and to the vehicle centerline (i.e., an axis that is parallel to the direction of travel when the vehicle 200 is traveling straight and bisects the vehicle 200), resulting in no roll stabilization. In other words, the user-generated force is an internal force that is redistributed internally between the foot peg 211 and the motorcycle frame (i.e., the chassis 210).

In contrast, FIG. 2B shows the vehicle 200 with a balance board 100. As shown, the balance board 100 may include a coupling mechanism 110 (shown as a roll pin joint), one or more frames 120, one or more moving elements (shown as wheel 130a), and one or more foot support pedals 140 coupled to the frame 120. The balance board 100 may be disposed between the front wheel 220 and the rear wheel 230 and located below the chassis 210. The coupling mechanism 110 does not fully constrain the balance board 100 to the vehicle 200, but rather provides one or more degrees of freedom that allows the balance board 100 to rotate with respect to the chassis 210.

When a user operates the vehicle 200 with the balance board 100, the user's foot may instead rest on the foot support pedal 140. In this case, if the user applies a force via their foot, the force goes through the balance board 100 and into the ground. A reaction force from the ground is then applied to the vehicle 200 through the wheel 130a. Therefore, the user-generated force is converted from an internal force in FIG. 2A to an external force via the balance board 100. The balance board 100 allows the user to stabilize the vehicle 200 as the vehicle 200 leans and/or rolls since the balance board 100 rotates relative to the chassis 210 and the contact points between the balance board 100 and the ground are laterally offset from the vehicle centerline.

Figure 2C:
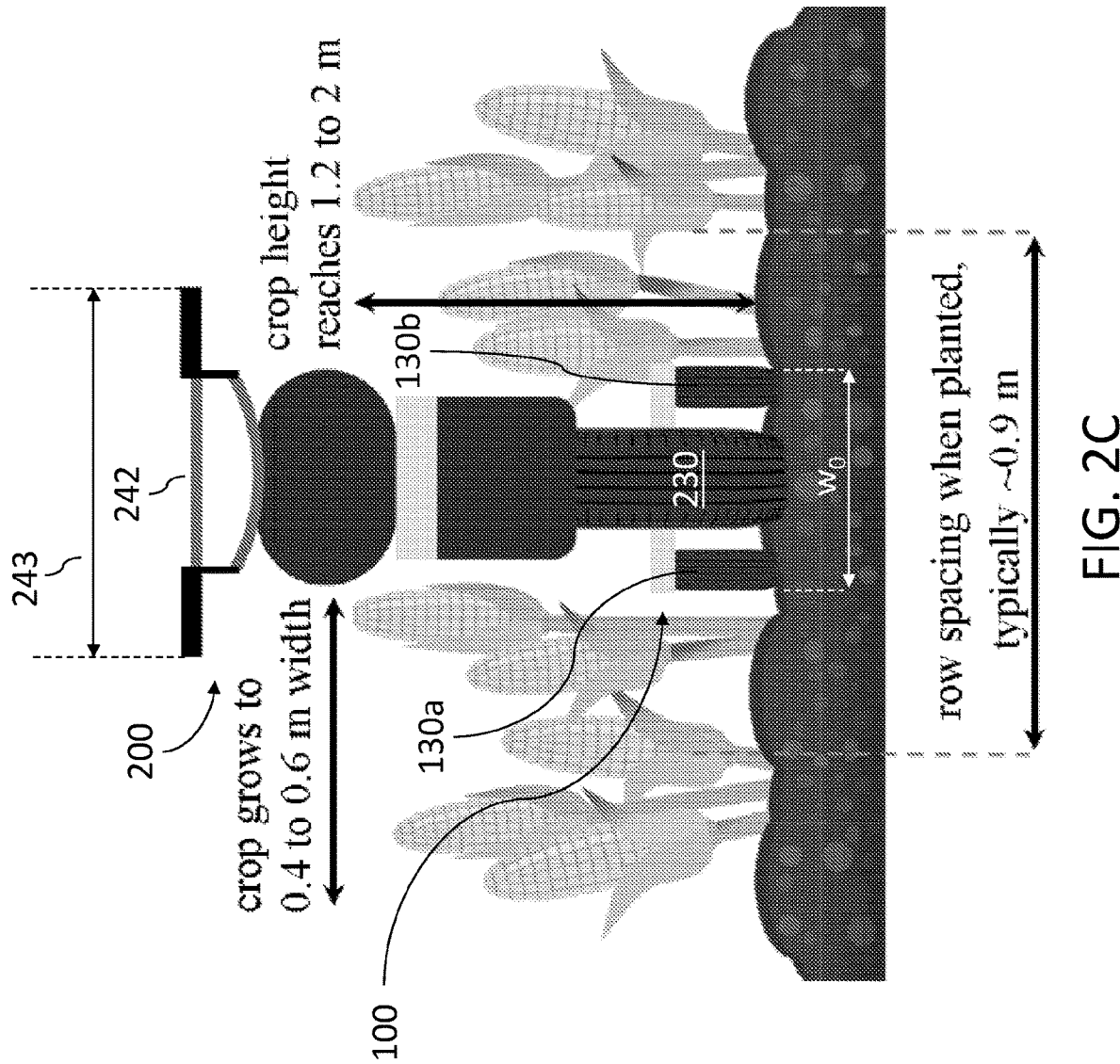
FIG. 2C shows a rear view of an exemplary vehicle with a balance board according to the inventive concepts disclosed herein, and various dimensions relevant to farming applications.

In some implementations, the balance board 100 may be shaped and/or dimensioned to fit between the front wheel 220 and the rear wheel 230. The balance board 100 may also fit beneath the chassis 210. In some implementations, the overall width of the balance board 100 ($w_0$) may be constrained to be less than the overall width of the vehicle 200. For example, $w_0$ may be defined as the distance between an outer side of the wheel 130a and the outer side of the wheel 130b as shown in FIG. 2C. The wheels 130a and 130b are collectively referred to herein as wheels 130. In some implementations, $w_0$ may be constrained to be less than a width 243 of the handlebars 242. In some implementations, $w_0$ may be constrained by the environment. For example, FIG. 2C shows the vehicle 200 and the balance board 100 operating on a farm. The balance board 100 may be dimensioned to have a $w_0$ to fit between rows of crops on the farm based on the expected width, height, and spacing of the crops. In some implementations, $w_0$ may be less than or equal to about 0.5 m.

The coupling mechanism 110 couples the balance board 100 to the chassis 210 in a manner that allows the balance board 100 to move with respect to the vehicle 200. In general, the coupling mechanism 110 may provide a sufficient number of rotational DOF (e.g., two or more rotational DOF) with respect to the vehicle 200. The rotational DOF may allow the balance board 100 and, in particular, the moving elements of the balance board 100 to remain in physical contact with the ground as the vehicle 200 rotates (e.g., rolls and/or tilts). The rotational DOF may also allow the balance board 100 to steer freely with respect to the vehicle 200 as the vehicle 200 turns or moves side to side.

In some implementations, the location along the chassis 210 where the coupling mechanism 110 is connected may affect the motion of the balance board 100. For example, a balance board 100 coupled near the rear wheel 230 of the vehicle 200 may experience a smaller rotation about a steering axis (e.g., the steering angle α) when the vehicle 200 turns, as will be discussed in more detail below. In another example, a balance board 100 may be coupled closer to the center of the chassis 210, between the front wheel 220 and the rear wheel 230, to provide a more ergonomic configuration due to the balance board 100 being located near the natural resting position of the user's feet.

The coupling mechanism 110 may include various types of mechanisms to couple the balance board 100 to the vehicle 200 including, but not limited to a ball joint (also referred to as a "ball hitch") and two or more pin joints. The coupling mechanism 110 may further be detachable/attachable to the vehicle 200 to allow a user to reconfigure the vehicle 200 according to their preferences. For example, the user may remove the balance board 100 from the vehicle 200 to operate the vehicle 200 in its stock configuration. In another example, the user may attach the balance board 100 to the vehicle 200 when entering an area where the speed of the vehicle 200 is limited to low speeds (e.g., a city, a farm).

The frame 120 may be a rigid structure formed from one or more links (i.e., a two-force member, an arm). In some implementations, the frame 120 may be rigidly coupled to the coupling mechanism 110, thus the frame 120 and the coupling mechanism 110 move together. In some implementations, the frame 120 may move with respect to the coupling mechanism 110 about one or more axes. For example, the frame 120 may rotate about a pin joint with respect to the coupling mechanism 110.

The frame 120 may support the moving element and the foot support pedal 140 of the balance board 100. In some implementations, the frame 120 may couple respective moving elements (e.g., the wheels 130a and 130b) and/or the foot support pedals 140 together (see, for example, balance board 100a). In some implementations, the balance board 100 may include separate frames that each support a moving element and/or a foot support pedal 140 and are linked together by the coupling mechanism 110 (see, for example, balance boards 100b and 100c). The respective frames of the balance board 100 may move independently with respect to one another about one or more DOF (e.g., the wheels 130a and 130b may pivot independently with respect to each other and the vehicle 200).

The moving element may correspond to a component of the balance board 100 that physically contacts the ground and, hence, moves with respect to the ground as the vehicle 200 moves. The moving element may be, for example, a wheel or a ski. In some implementations, the balance board 100 may include multiple moving elements (e.g., the wheels 130a and 130b, a pair of skis). In some implementations, the balance board 100 may include a combination of a wheel and a ski so that the balance board 100 may travel along both hard terrain (e.g., an asphalt road, a concrete sidewalk) and soft terrain (e.g., sand, dirt, mud, grass).

In some implementations, the moving element may be rotatably coupled to the frame 120. For example, the wheel 130 may rotate with respect to the frame 120 to allow the wheel 130 to roll along the ground. The wheel 130 may also rotate about a second rotation axis that allows the wheel 130 to steer independently from the frame 120 (e.g., a caster wheel). Similarly, a ski may also rotate with respect to the frame 120 for steering. In some implementations, the motion of multiple moving elements in the balance board 100 may be coupled together. For example, the wheels 130a and 130b may be coupled to a common axle so that the wheels 130a and 130b rotate together.

In some implementations, the wheel 130 may also include a spring (e.g., a torque spring) and/or a damper coupled to the steering axis 131 of the wheel 130. The spring and/or damper may be configured to keep the wheel 130 pointed along a preferred direction (e.g., a forward direction of the vehicle 200) and/or reduce unwanted wobble motion of the wheel 130.

The foot support pedal 140 may provide a structure or a platform for the user to rest their foot on when operating the vehicle 200. In some implementations, the foot support pedal 140 may be rigidly coupled to the frame 120 such that the frame 120 and the foot support pedal 140 move together. For example, the moving element may rotate with respect to the frame 120 and, by extension, the foot support pedal 140, about multiple rotation axes. This allows the user's foot to remain substantially parallel with the vehicle 200 while allowing the moving elements to steer when the vehicle 200, for example, is traveling along the side of a slope, as discussed in more detail below.

In some implementations, the foot support pedal 140 may be coupled to the wheel 130. For example, the foot support pedal 140 may remain parallel to an axle of the wheel 130 even if the wheel 130 rotates with respect to the frame 120. This may provide the user kinesthetic feedback to the direction of the wheel 130. Additionally, this configuration may enable the user to control the direction of the wheel 130 by applying a torque via their leg/foot.

In another advantageous aspect, in some implementations of a balance board according to the inventive concepts disclosed wherein, when driving over relatively smooth ground in side slopes, the balance board wheels can remain not only in contact with the ground surface but parallel to it (i.e., the rotation axis of the balance board wheels would remain parallel to the ground plane and not to the vehicle's rear wheel axis. This design aspect provides a larger contact area and better sidewall engagement during side-slip.

2. A Balance Board with a Ball Hitch

Figure 3A:
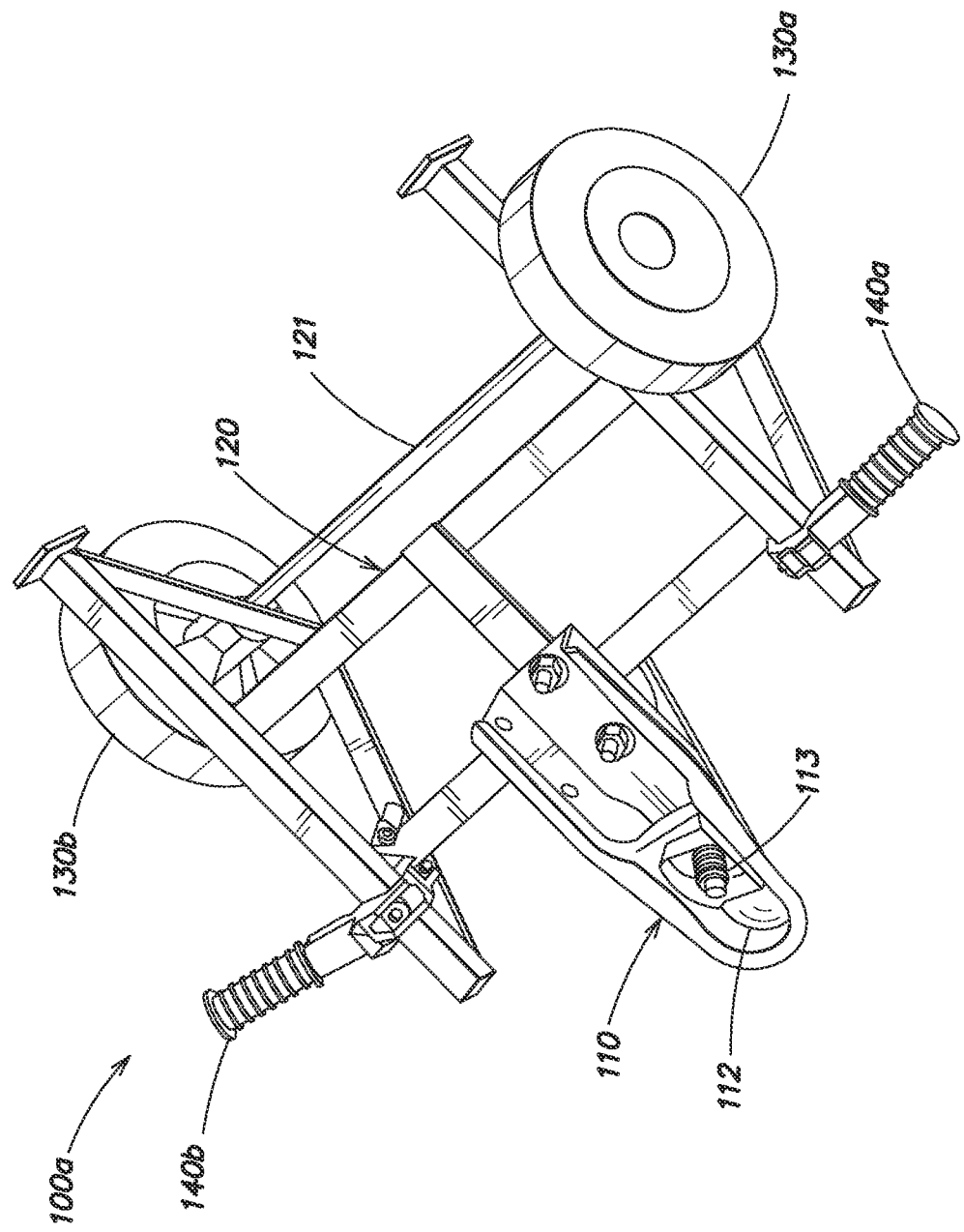
FIG. 3A shows an exemplary balance board with a ball hitch attachment mechanism to couple to a two-wheeled vehicle, according to the inventive concepts disclosed herein.

FIG. 3A shows an exemplary balance board 100a that includes a ball hitch (i.e., a ball joint) to couple the balance board 100a to the chassis 210 of the vehicle 200. As shown, the balance board 100a may include a coupling mechanism 110 that includes a cup 112 forming a portion of the ball hitch. The coupling mechanism 110 may also include a locking mechanism 113 to secure the balance board 100a to the chassis 210. The coupling mechanism 110 may be mounted to a frame 120. The balance board 100a may further includes wheels 130a and 130b rotatably coupled to the frame 120. In some implementations, the wheels 130a and 130b maybe coupled together by an axle 121 such that the wheels 130a and 130b rotate together. The balance board 100a may also include foot support pedals 140a and 140b coupled to opposing sides of the frame 120 corresponding to opposing sides of the vehicle 200 so that the user's respective feet may rest on the foot support pedals 140a and 140b.

Figure 3B:
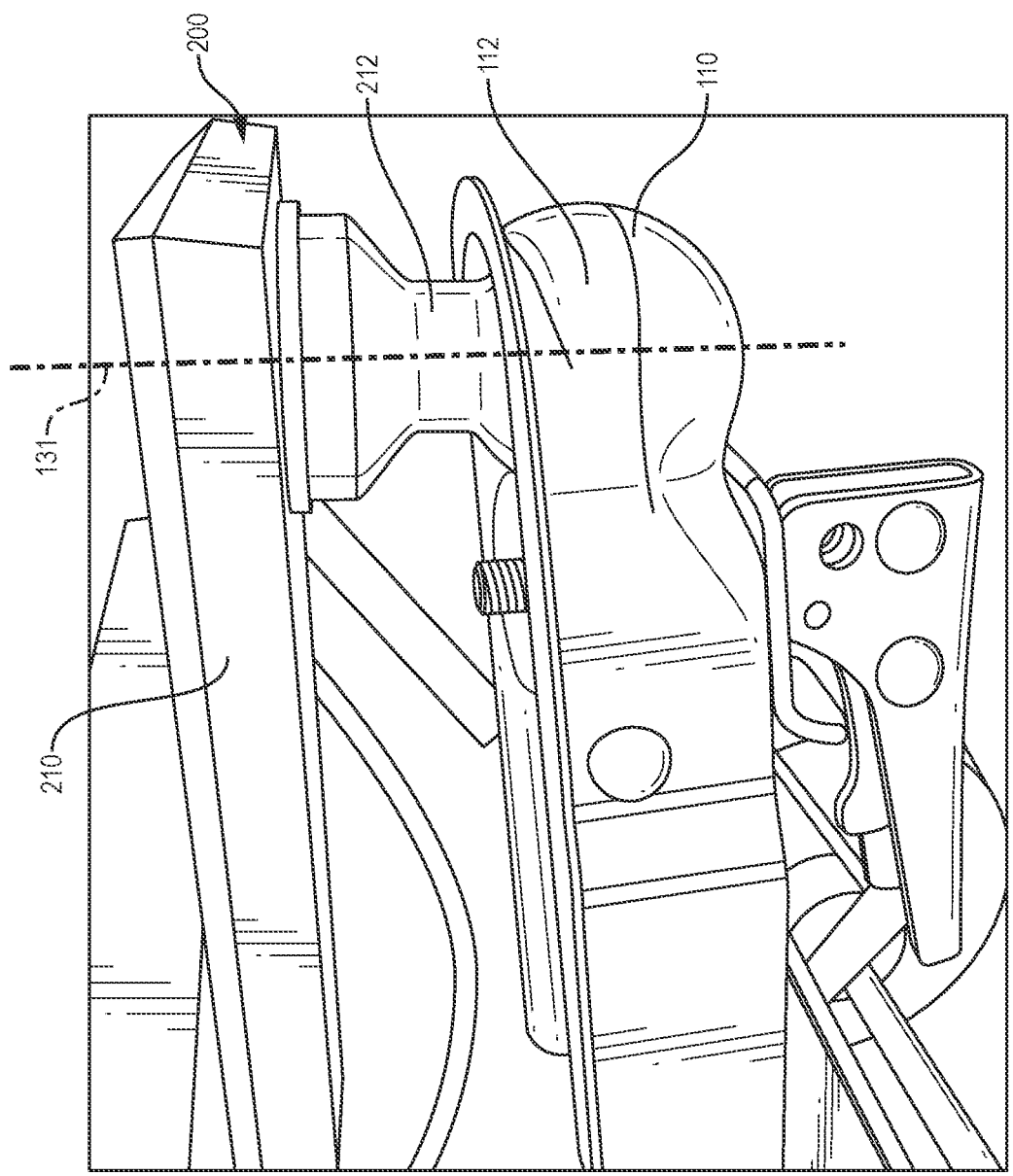
FIG. 3B shows a magnified view of the ball hitch mechanism of FIG. 3A.
Figure 4A:
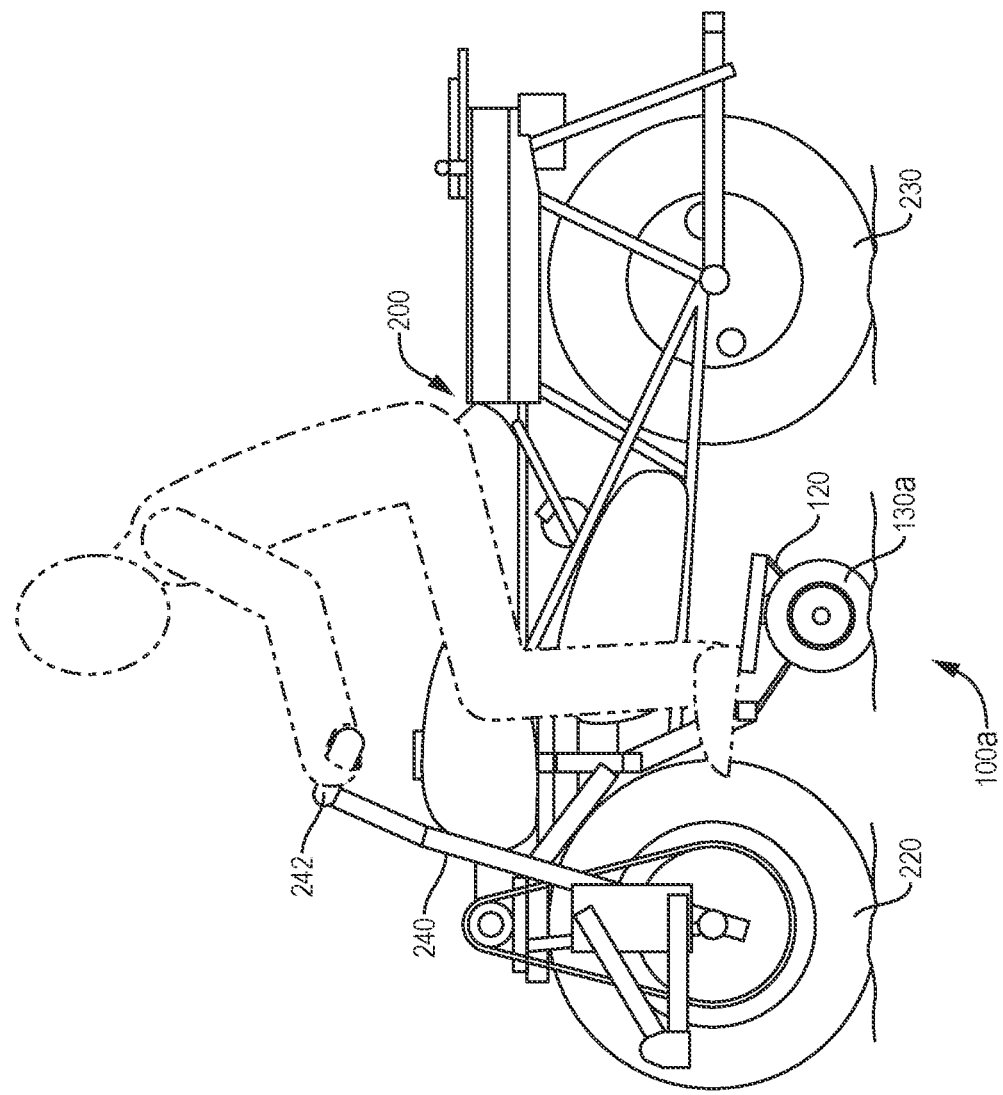
FIG. 4A shows a photograph of a vehicle with the inventive balance board of FIG. 3A being operated by a rider.
Figure 4B:
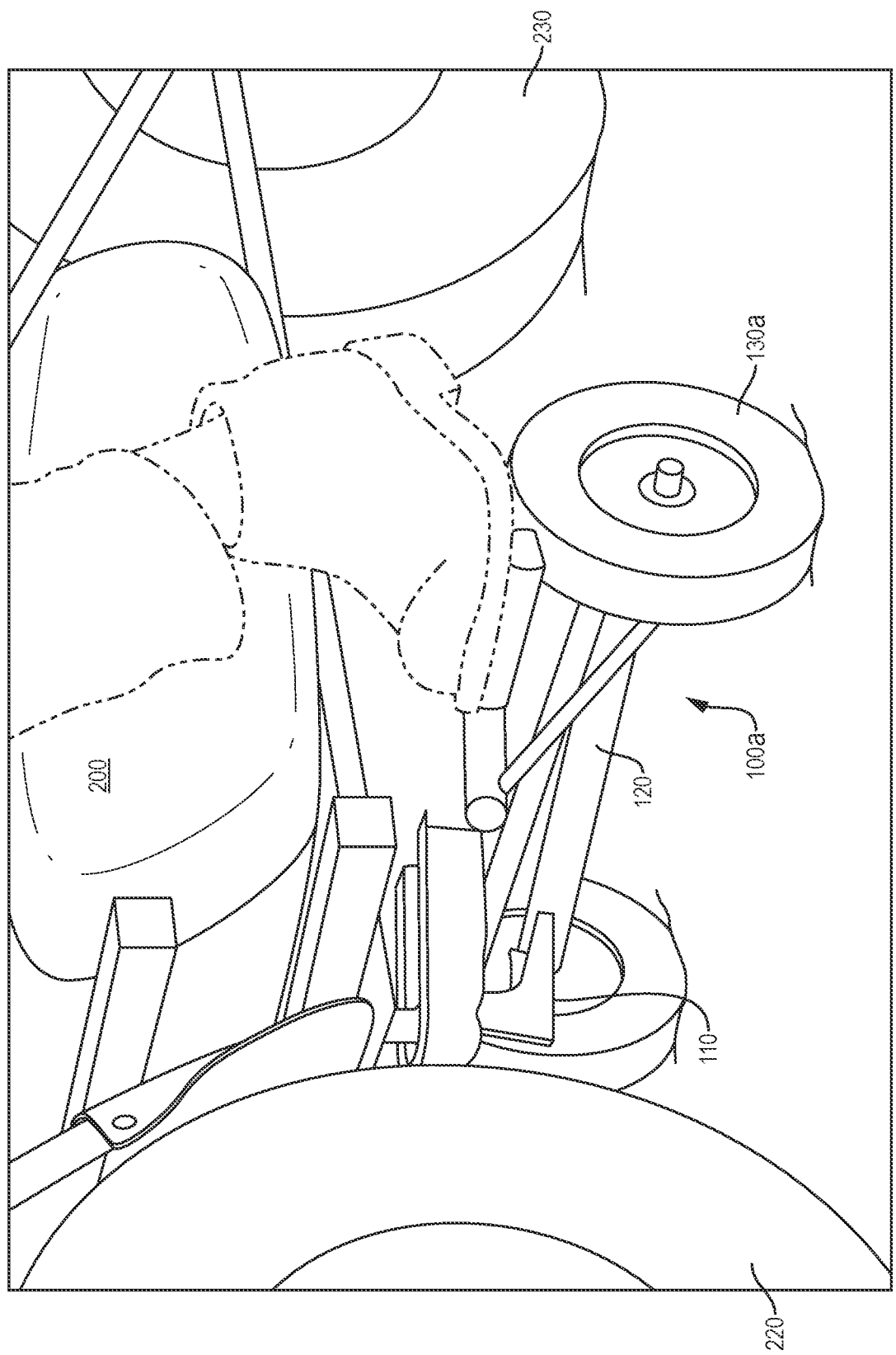
FIG. 4B shows another photograph of the vehicle of FIG. 4A, including the inventive balance board of FIG. 3A, being operated by the rider.

FIG. 3B shows the coupling mechanism 110 of the balance board 100a coupled to a chassis 210, according to one example implementation. As shown, the chassis 210 may include a ball 212 that couples to the cup 112 of the balance board 100a to form the ball hitch. The locking mechanism 113, in turn, may secure the cup 112 to the ball 212. For example, the locking mechanism 113 may be an adjustable component that wraps around a portion of the ball 212. When the lock 113 is secured to the coupling mechanism 110 (e.g., via a screw fastener, a bolt fastener, or a lever actuated mechanism), the coupling mechanism 110 and, by extension, the rest of the balance board 100a may be translationally constrained to the ball 212 while being able to rotate freely about the ball 212. In other words, the balance board 100a may rotate independently with respect to the vehicle 200 for a large range of rotational motion. In one example, the coupling mechanism 110 may be a conventional ball hitch, in which a toggle latch seats a tab against the ball that holds it in place. The toggle latch is adjustable via a threaded rod that goes through a nut affixed to the tab. By adjusting the threaded rod, one can adjust how tightly the ball is grasped.

In this implementation, the coupling mechanism 110, the frame 120, the wheels 130a and 130b, and the foot support pedals 140a and 140b may be mechanically coupled to rotate together about rotational axes defined by the ball hitch of the coupling mechanism 110. For example, FIG. 3B shows the coupling mechanism 110 may define a steering axis 131 (i.e., a yaw axis of the vehicle 200) about which the balance board 100a rotates as the vehicle 200 moves side to side and/or turns.

The balance board 100a may be mounted directly behind the front wheel 220 of the vehicle 200. As described above, when the vehicle 200 is traveling at slow speeds, the vehicle 200 may be unstable in the roll direction, causing the vehicle 200 to tip sideways. When the vehicle 200 begins to roll sideways, the user may press down onto either the foot support pedal 140a or 140b of the balance board 100a (which remains flat on the ground) with the leg/foot on the side of the vehicle 200 towards which the vehicle 200 is tipping. This, in practice, has a very similar stabilization effect to pressing against the ground (as one would do without the balance board 100a), but has two advantages: (1) the distance the driver has to reach to the balance board 100a is much shorter than to the ground, allowing the driver to maintain a natural riding position, and (2) the rider is pressing down onto a surface that is largely static relative to them since the balance board 100a is moving forward with the motorcycle 200 (as opposed to dragging a foot on the ground or tip-toeing on the ground).

3. Design Considerations for the Balance Board

Figure 5A:
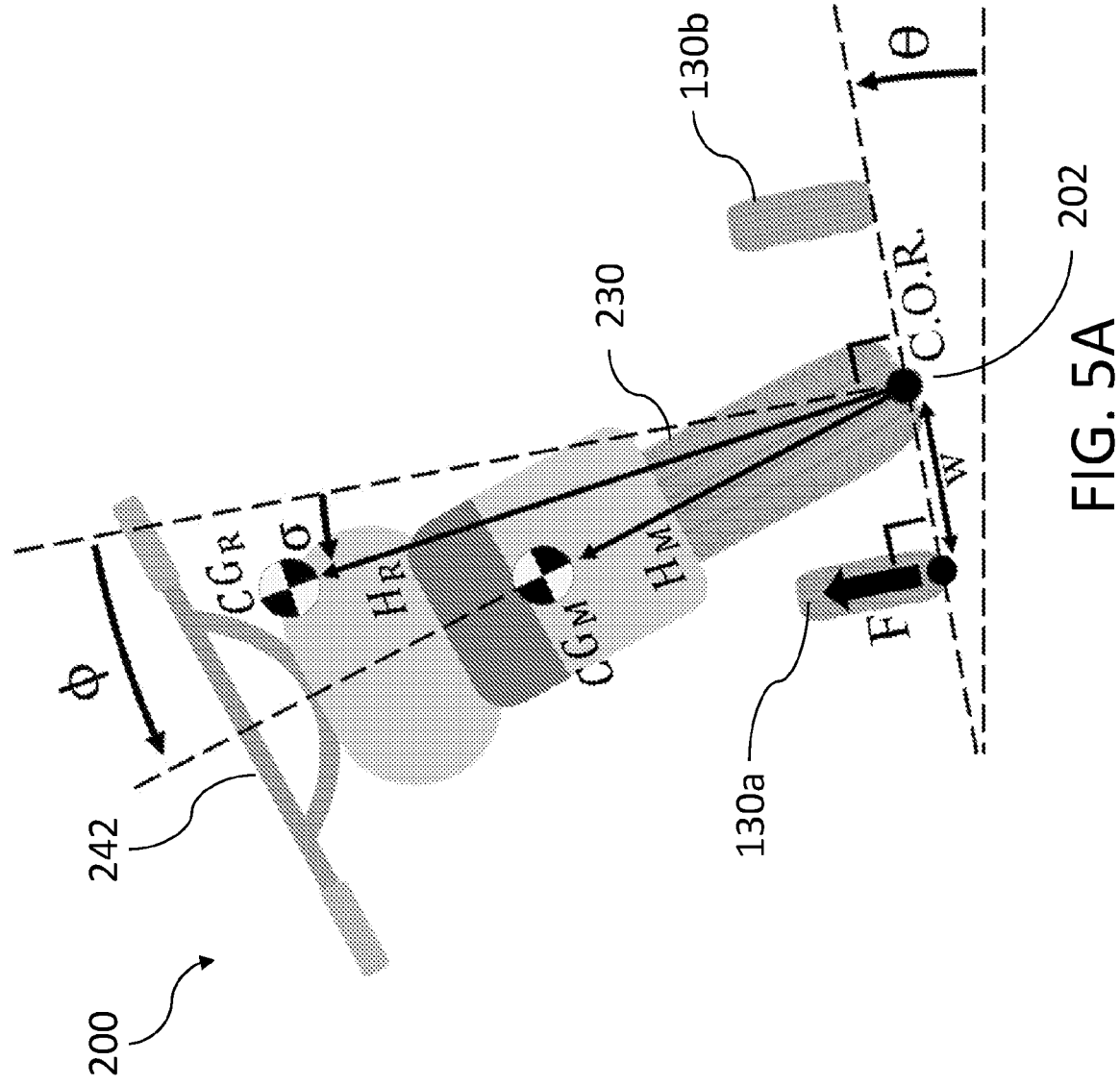
FIG. 5A shows a rear view of an exemplary vehicle and respective wheels of a balance board according to the inventive concepts disclosed herein, with annotations of various dimension variables used for calculations of user force to prevent vehicle rollover.
Figure 7C:
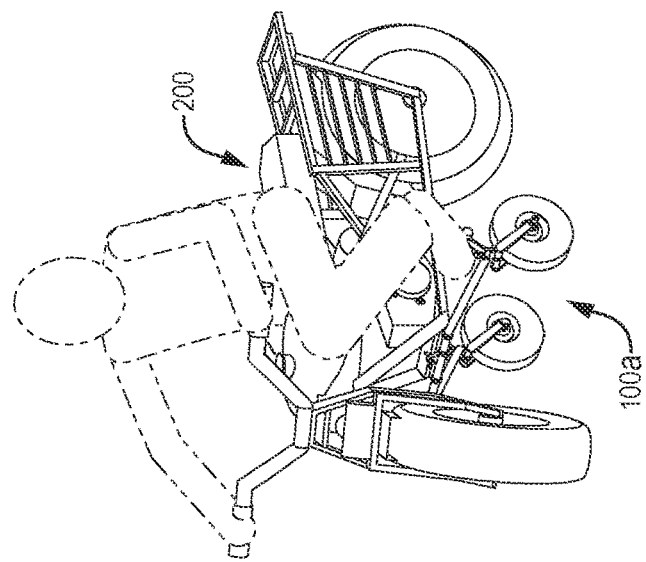
FIG. 7C shows a photograph of the vehicle with the inventive balance board of FIG. 3A undergoing a turning situation where the rider's feet remain on the balance board during a tight turn.
Figure 7B:
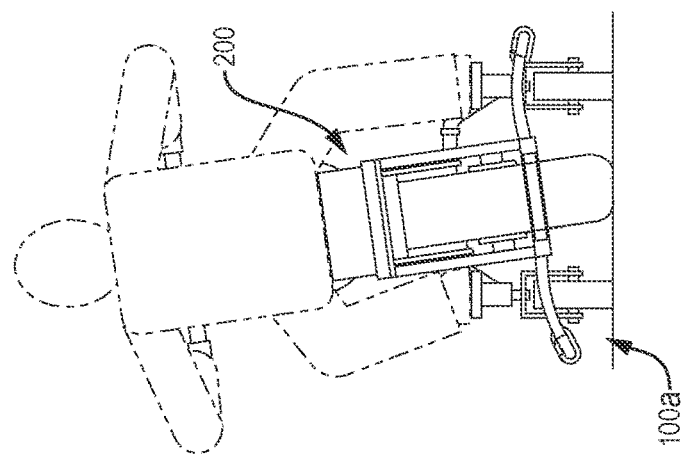
FIG. 7B shows a photograph of the vehicle with the inventive balance board of FIG. 3A undergoing a turning situation where the rider is leaning during a high-speed turn.
Figure 7A:
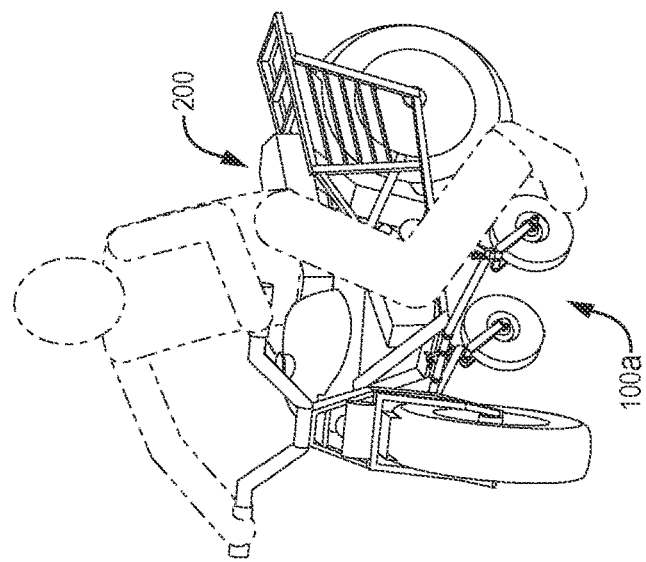
FIG. 7A shows a photograph of the vehicle with the inventive balance board of FIG. 3A undergoing a turning situation where the rider's foot is placed onto the ground during a tight turn.
Figure 8B:
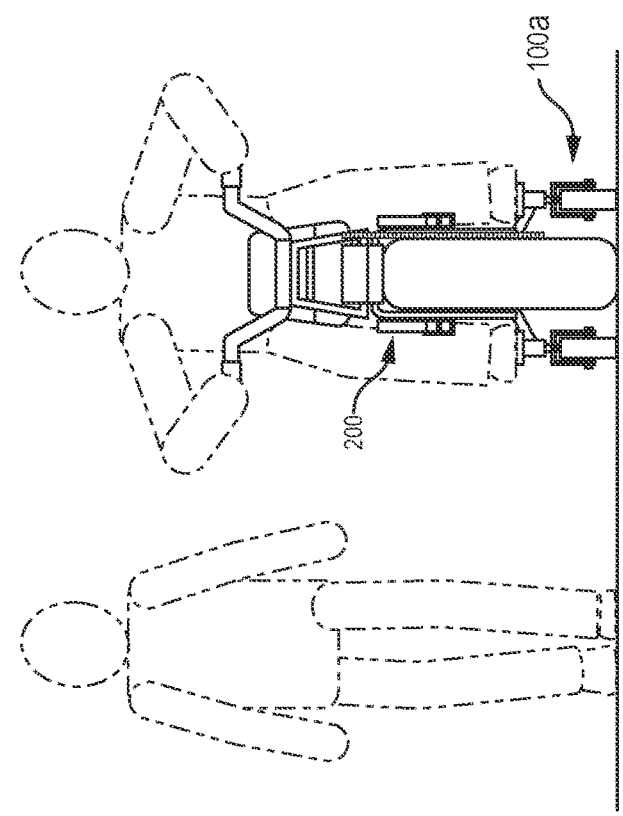
FIG. 8B shows a photograph of the vehicle with the inventive balance board of FIG. 3A driving at slow speeds (e.g., walking pace) in a straight line.
Figure 8A:
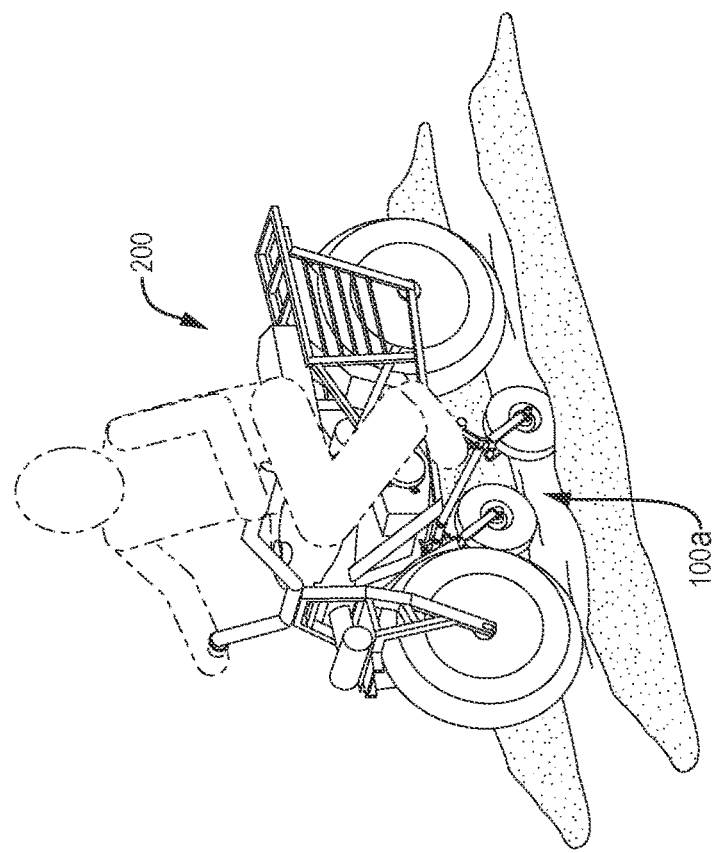
FIG. 8A shows a photograph of the vehicle with the inventive balance board of FIG. 3A driving at slow speeds through a confined space, such as dirt mounds separated by 60 cm, which corresponds to the smallest crop spacing the vehicle would operate in a typical agricultural setting.

Generally, the force (F) applied to correct the roll/lean of a motorcycle 200 is small since the user intuitively balances the motorcycle 200 by continually performing small corrections to compensate small rotations of the motorcycle 200 rather than waiting for a large roll/lean to act. The force to correct the leaning of the motorcycle 200 varies non-linearly with, for example, the side-slope angle (θ), the motorcycle's lean angle (ϕ), and the driver's body position (σ). It can be observed from Eq. 1 and FIG. 5A that the user's body lean may help correct the roll/lean of the motorcycle 200 (i.e., by lowering the magnitude of F in Eq. 1 down to, for example, zero) if the sign of (σ+θ) is opposite of the sign of (ϕ+θ). If the user and motorcycle 200 lean together into the side slope, the balancing force F may become zero in the case where (σ) and (θ) are each equal and opposite to (θ) (i.e. ($CG_{Moto}$) and ($CG_{R}$ider) are both directly above the assumed center of rotation (COR) along a longitudinal axis 202 of the motorcycle, which axis is orthogonal to the plane of the drawing in FIG. 5A and parallel to the chassis 210 of the motorcycle). An example of the rider and motorcycle 200 leaning into the side slope to reduce force F is shown in image B of FIG. 9B.

motorcycle turns 200 is an important design consideration. The balance board wheels 130 should preferably steer as the vehicle 200 turns, which effectively reduces the value of w in Eq. 1. The decrease in w results in an increase of the user-generated force F to keep the vehicle 200 upright. In relatively fast turns, the increase of force F may be fully or nearly fully counteracted by the inertial ("centrifugal") forces occurring at the motorcycle's and rider's CGs. However, in slower turns where the rider is leaning simply to induce a tighter turning radius, the decrease in the value of w may be detrimental to usability. FIG. 7C shows, for example, the inner foot of the user on the inside of the turn being swung towards the motorcycle 200 centerline, effectively reducing w. FIG. 7A shows the balance board 100a does not interfere with the user's ability to put their foot on the ground for very tight, slow turns (as on a standard motorcycle) if that is their preference.

Figure 5B:
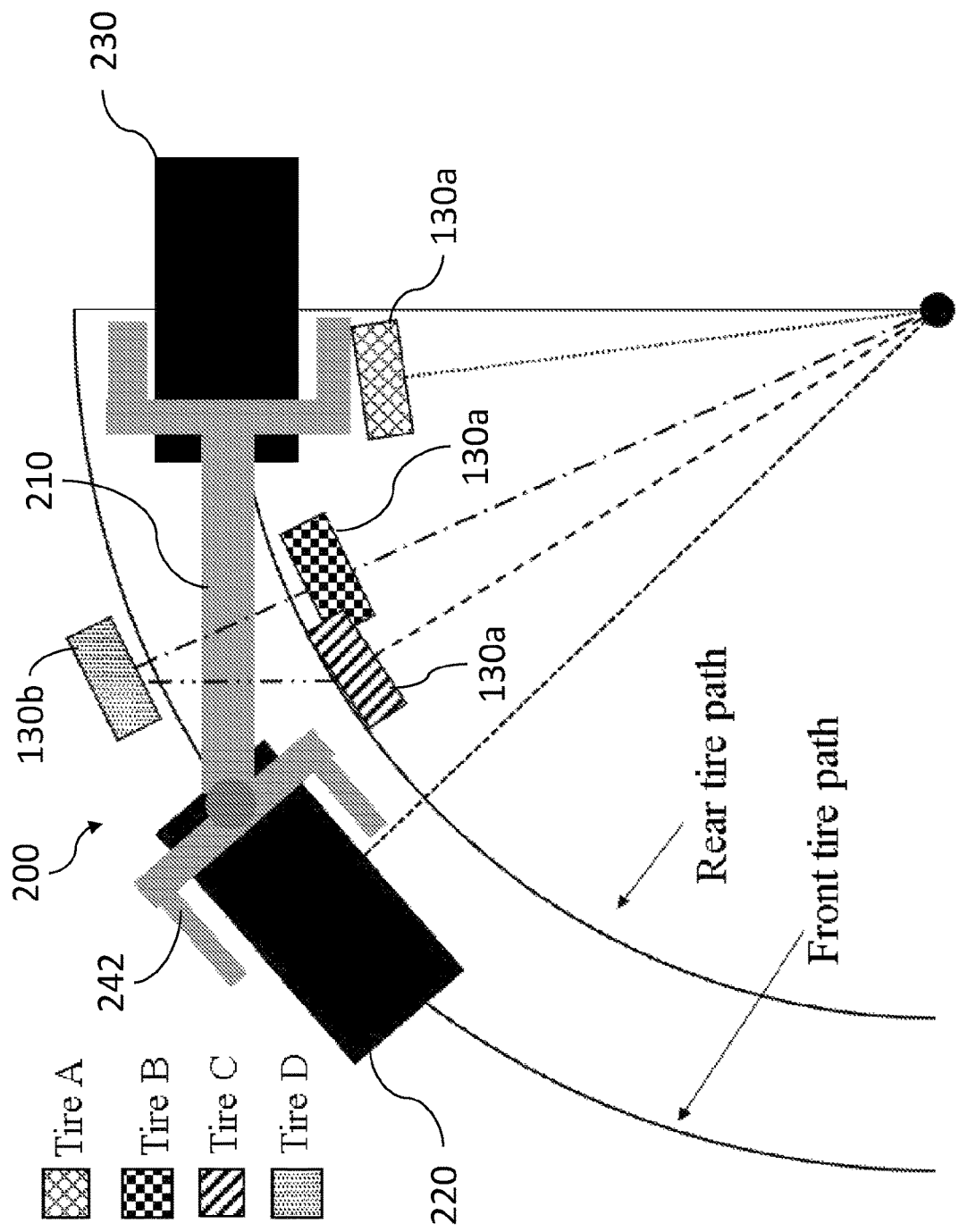
FIG. 5B shows an overhead view of an exemplary vehicle and the positions of respective wheels of a balance board according to the inventive concepts disclosed herein while the vehicle is turning, wherein the respective wheels are mounted at various locations of the vehicle chassis.
Figure 5C:
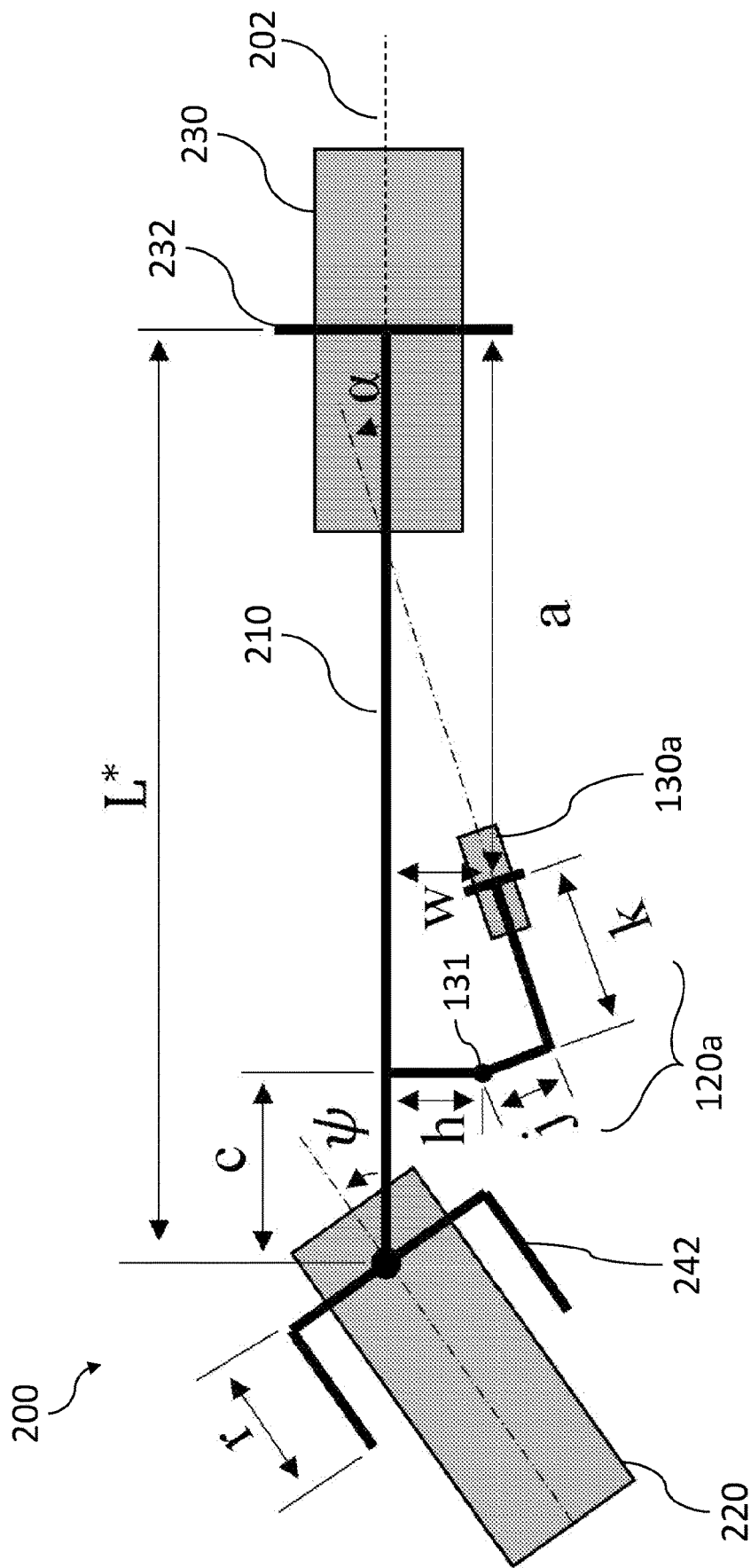
FIG. 5C shows an overhead view of an exemplary vehicle including a balance board according to the inventive concepts disclosed herein, with annotations of various dimension variables for the mounting of the wheels of the balance board, when the vehicle turns without leaning.
Figure 5D:
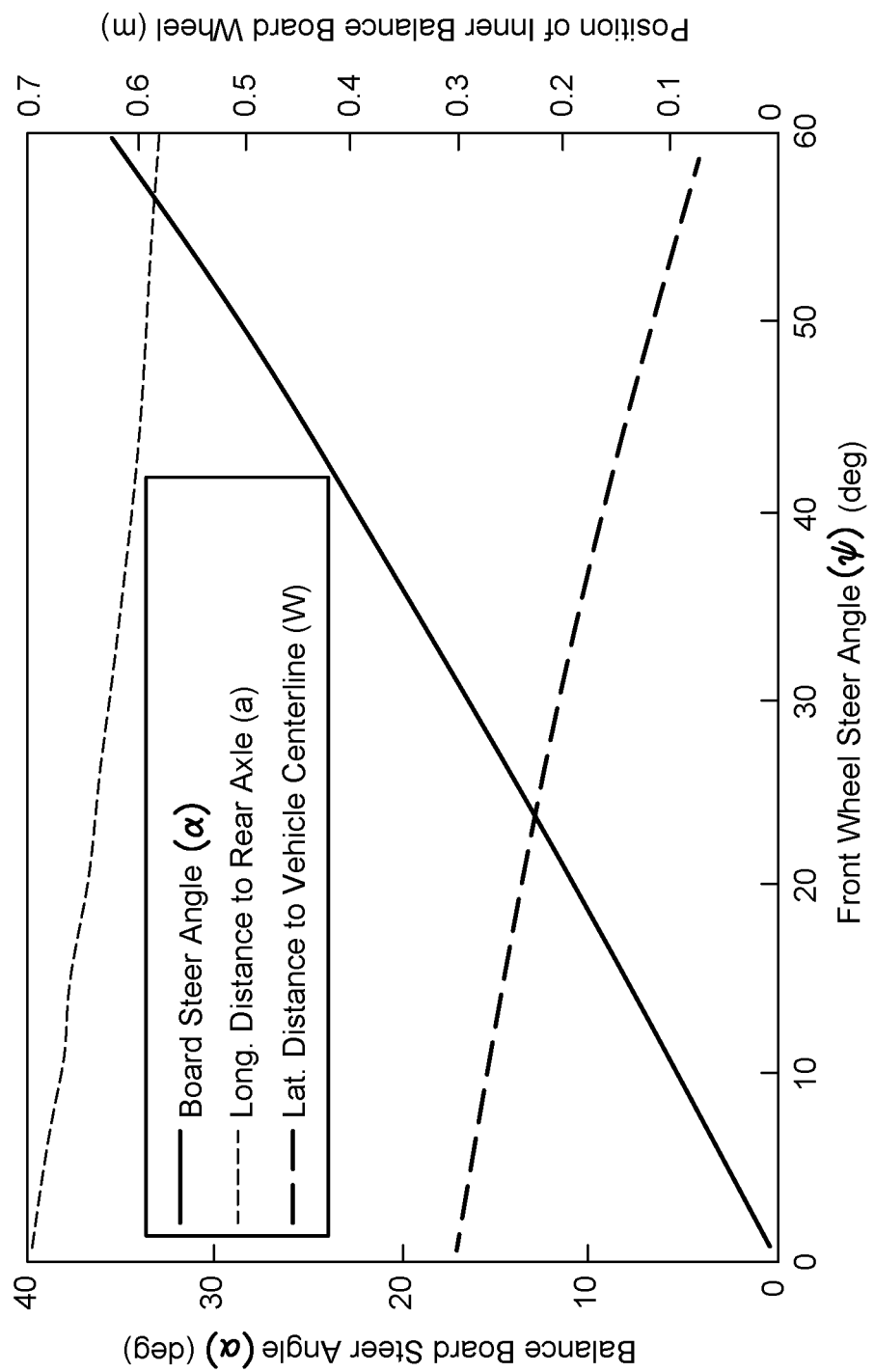
FIG. 5D shows a chart of steer angle ($\alpha$) and the position of an inner wheel of a balance board according to the inventive concepts disclosed herein, as a function of the front wheel steer angle ($\psi$) of the vehicle including the balance board.

Eqs. 2-4 and FIGS. 5B-5D provide insight into the effects of the dimensions of the balance board 100 on the steering motion of the balance board wheels 130 during a turn. In FIG. 5B, tire "A" demonstrates that placing the balance board wheels 130 longitudinally close to the rear axle 232 reduces the amount in which the balance board wheels 130 turn (i.e. the turning angle α) as the vehicle 200 turns. Tires "B" and "C" are located progressively further from the back wheel 230 (i.e., closer to the front wheel 220), which results in larger turning angles. Tires "B" and "C," as shown, are connected to the chassis 210 via a rigid axle that rotates at its midpoint to demonstrate the additional fore and aft motion that such an arrangement would cause. Eq. 4 is based on the dimension variables described in FIG. 5C.

Eq. 2 describes the longitudinal position (i.e., distance a) from the inside balance board wheel (e.g., wheel 130a in FIGS. 5B and 5C) to the rear axle 232 during slow turns where the motorcycle 200 does not lean relative to the ground. This scenario is expected to be important and common for target users. Eq. 2 is calculated by assuming the pivot between distances h and k has a vertical axis of rotation (steering axis 131). To connect Eq. 2 to the balance board 100a (where h=0), one should assume the ball joint may be represented by a pin joint with a vertical axis since the motorcycle is operating on flat ground with no lean (i.e., steering axis 131). In other words, the balance board 100a will only have yaw rotation and no pitch or roll rotation relative to the motorcycle 200.

$$F = \frac{g}{w}(m_M H_M \sin(\phi + \theta) + m_R H_R \sin(\sigma + \theta)), \quad (1)$$

where F=the user applied force (also referred to herein as the "balance force"), g=the acceleration of gravity, w=the distance parallel to the ground from the assumed center of rotation (COR) to the wheel 130 of the balance board 100 towards which the motorcycle 200 is falling, $m_M$=the total mass of the motorcycle 200 (excluding the balance board 100), $H_M$=the distance from ground to the motorcycle's CG location when the vehicle 200 is parallel to gravity, ϕ=the lean of the vehicle 200 relative to the ground normal, $m_R$=the total mass of the rider, $H_R$=the distance from ground to the rider's CG location when the vehicle 200 and rider are parallel to gravity, σ=the lean of the rider relative to the ground normal, and θ=the side slope angle.

It has been found during testing that the motion of the balance board 100 relative to the motorcycle 200 as the $$a = L^* - c - \sqrt{j^2 + k^2} \cos\left(\tan^{-1}\left(\frac{k}{j}\right) - \alpha\right) \quad (2)$$

Eq. 3 is calculated in the same manner as Eq. 2 in order to determine the lateral distance, w, between the inside balance board wheel 130a and the motorcycle centerline, which is orthogonal to the distance a from Eq. 2.

$$w = h + \sqrt{j^2 + k^2} \sin\left(\tan^{-1}\left(\frac{k}{j}\right) - \alpha\right) \quad (3)$$

Eq. 4 is calculated from the geometric constraints shown in FIG. 5B and the kinematics of FIG. 5C. FIG. 5B shows that in a zero slip turn with no leaning, the projections from the wheel axles intersect at the turn center. The steer angle of the balance board (a) is thus found for the vehicle geometry shown in FIG. 5C.

$$\alpha = \frac{\pi}{2} - \tan^{-1}\left(\frac{\tan\left(\frac{\pi}{2} - \psi\right)(L^* + r\cos(\psi))\sin(\psi) - w}{a}\right) \quad (4)$$

In Eqs. 2-4, a=the distance from the rear axle 232 to the axle of the inside outboard wheel 130a, L*=the distance from the rear axle 232 to the lowermost point of the headtube, g=the acceleration of gravity, r=the rake of the fork measured as a distance from the front axle to lowermost part of the headtube, h=the lateral distance from the vehicle centerline to the yaw (steering) pivot 131 of the balance board wheel 130a, j=the lateral distance from the yaw (steering) pivot 131 to the balance board wheel 130a when α is zero, k=the longitudinal distance from the yaw (steering) pivot 131 to the balance board wheel 130a when α is zero, c=the longitudinal distance from the lowermost point of the motorcycle headtube to the balance board yaw pivot 131, ψ=the steering angle of the front wheel 220, α=the steering angle of the balance board wheel 130a. Dimensions are overlaid on a simplified schematic of the vehicle in FIG. 5C.

FIG. 5D shows the change in w, a, and α as a function of the front wheel steer angle (v) determined using Eqs. 2-4 to illustrate the effects on these parameters as the vehicle turns. FIG. 5D is determined for using dimensions based on the balance board 100a (i.e., c=0.23 m, h=0 m, j=0.27 m, k=0.30 m). The dimensions of the balance board 100a were selected to match the lateral position of stock motorcycle pedals and to yield an easy to manufacture proof-of-concept design. It is assumed that the vehicle 200 is undergoing a steady-state, slow speed turn (no vehicle leaning).

Notice that for tighter turns (i.e. greater front wheel steer angle), the inside balance board wheel 130a moves closer to the vehicle centerline (a smaller w) which increases the balance force F in Eq. 1. In some cases, the balance board foot support 140a may slide under the motorcycle frame (FIG. 7C shows this process starting to occur). Since the balance board wheel axle is parallel to the foot supports 140 in the balance board 100a, a change to the board steer angle α also cause the foot supports 140 to rotate. This affects the ergonomics of pressing on the foot pedal 140 and can result in potential discomfort for users operating the vehicle barefoot or wearing soft soled sandals. A reduction in the distance from the foot supports 140 to the rear axle a may also affect the ergonomics by bending the user's knee at a more acute angle and placing their foot further under their hip. However, during the initial tests of the balance board 100a, the change in magnitude of a was insufficient to be perceived as an issue by the riders. It can be seen in FIG. 5D that the motion of a is not as large as the motion of w for reasonable steer angles θ.

4. Demonstration of the Balance Board with a Ball Hitch

The balance board 100a was fabricated and subjected to initial qualitative tests to confirm the viability of the balance board concept as a tool for augmenting motorcycle usability at slow speeds, particularly, in uneven, unpaved terrain. Specifically, the balance board 100a was coupled to an all-wheel-drive, off-road motorcycle 200. The specifications of the motorcycle 200 and the balance board 100a used for testing are shown in FIG. 6.

Figure 9B:
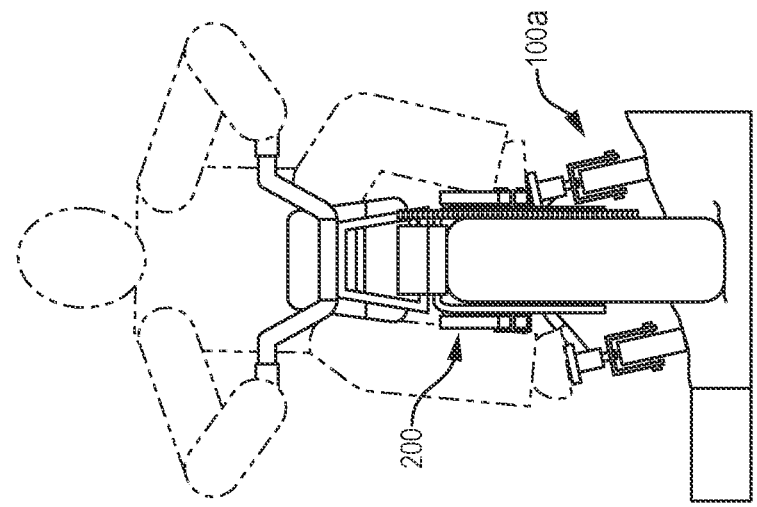
FIG. 9B shows a photograph of the vehicle with the inventive balance board of FIG. 3A traveling along a side of a slope.
Figure 9A:
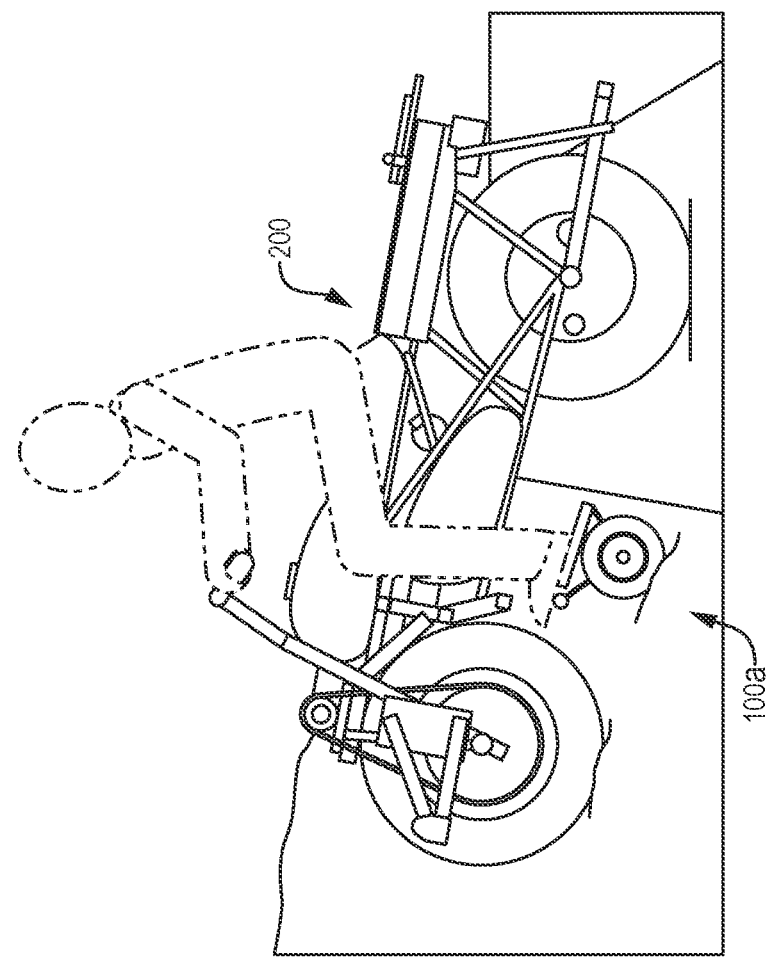
FIG. 9A shows a photograph of the vehicle with the inventive balance board of FIG. 3A traversing a steep uphill slope.

Drive testing included the following scenarios where the balance board 100a performed satisfactorily. (I) Turning (FIGS. 7A-7C). Turning at slow speeds with both feet on the balance board 100a (a feature of this device), maintaining the ability to turning at slow speeds while placing a foot on the ground, and turning at high speeds while leaning (maneuvers that are possible on a stock motorcycle). (II) Slow Speed Driving (FIGS. 4A, 4B, 8A and 8B). Three situations were tested: (1) gaining balance when mounting the motorcycle 200 at a standstill without initiating forward motion, (2) driving at a walking speed in close quarters, and (3) stopping to a full stand still while remaining upright. (III) Driving on Uneven Terrain (FIGS. 9A-9C). Three driving situations were tested: (1) driving up and down grassy terrain with pronounced slopes, (2) driving along a slope (i.e. perpendicular to the slope gradient direction), and (3) crossing sharp drop-offs of up about 20 cm.

The balance board 100a shows high potential as a viable intermediate option between motorcycles 200 and statically stable vehicles (e.g., three wheelers or four wheelers). The balance board 100a is no wider than the handlebars 242 of the motorcycle 200 and did not appreciably interfere with the motorcycle 200 accessing narrow spaces or performing the same maneuvers as that of a stock motorcycle. It was comfortable to stop and restart without placing a foot on the ground as well as to ride slowly in close quarters on uneven terrain. Further testing in an agricultural terrain with instrumentation for motorcycle lean as well as user effort may benefit subsequent refinements to the design of the balance board 100a.

Based on the initial qualitative tests of the balance board 100a, four areas of opportunity were identified for possible modification. (I) The balance board 100a moves the inside foot of the rider under the motorcycle 200 during tight turns as seen in FIG. 7C. (II) The effective ground clearance of the motorcycle 200 is reduced compared to a stock motorcycle. For example, when the balance board wheels 130 both roll over an elevated obstacle, the obstacle may cause the axle of the wheels to rise and hit the motorcycle frame 210. (III) When the user first mounts the motorcycle 200 at a standstill, it can be hard to balance the motorcycle 200 while remaining in place (i.e. without initiating forward motion of the motorcycle 200). Once the rider balances the motorcycle 200, it is easy to maintain balance thereafter. (IV) The current balance board wheels 130 are appreciably smaller in diameter than the motorcycle wheels 220 and 230 and the balance board frame 120 extends below the axle of the wheels 130. Tall, narrow obstacles (e.g., rocks) may hit the balance board frame 120 before they hit the balance board wheels 130, which may result in unwanted jarring of the rider.

In another advantageous aspect, in some implementations of a balance board according to the inventive concepts disclosed herein, the balance board can be attached and removed from a vehicle (e.g., a motorcycle) without tools. For example, in the implementation discussed above in connection with a ball hitch configuration of attaching the balance board to a vehicle, the hitch ball may remain on the vehicle (e.g., on the underside of a motorcycle) but the balance board itself can be easily removed (e.g., with a lever). In yet another advantageous aspect relating to this implementation, the balance board may be appropriately positioned on a vehicle and used as a mini-trailer for towing. For example, a second ball hitch (also facing down like the on the motorcycle under-belly and at similar ground height to it) could be fixed behind the rear wheel of the motorcycle. The balance board can then be coupled to the vehicle behind the rear wheel and carry some payload (e.g., a five gallon water tank).

5. A First Balance Board with Pin Joints

The design of the balance board 100 (e.g. geometry, dimensions) may generally be tailored to satisfy one or more design goals based, in part, on the geometric and kinematic modeling of the balance board 100 discussed in Section 3.

First, the balance board 100 should be tailored to reduce the balancing force F in Eq. 1.

Second, the balance board 100 width $w_0$ should be increased up to an allowable vehicle width (e.g., the width 243 of the handlebars 242, the width of the rear fender, the width of a trunk compartment coupled to the chassis of the motorcycle).

Third, Eq. 3 shows the lateral distance w varies when the vehicle 200 turns. In order to maintain w near its preferred value (e.g., one half the balance board width $w_0$) under most conditions, the range of the second term in Eq. 3 should be reduced. The first term in Eq. 3 is a constant. This may be achieved by decreasing the values of balance board dimensions k and j as well as decreasing the range of the balance board steering angle α. The balance board 100 should preferably allow the balance board steer angle α to equal zero during straight line driving. Thus, decreasing the range of α is equivalent to keeping a near zero. This may be achieved by decreasing the value of a in Eq. 4. The value of a may be reduced to values near zero by making $L^* \approx c$ and decreasing the value of j and k, as shown in Eq. 2.

In some implementations, it may not be practical to design a balance board 100 that satisfies several or all of the above design goals due to other factors including, but not limited to general ease-of-use, balance board wheel directional stability (increases with k), and manufacturing costs.

The balance board 100a described in Sections 2 and 4 is fully functional and has high potential to be a viable implementation due, in part, to its simple, easy-to-manufacture design. However, other implementations of the balance board 100 may include different structural features to modify the characteristics of the balance board 100 in order to meet one or more of the above design goals and/or to provide other functions to the rider.

Figure 10A:
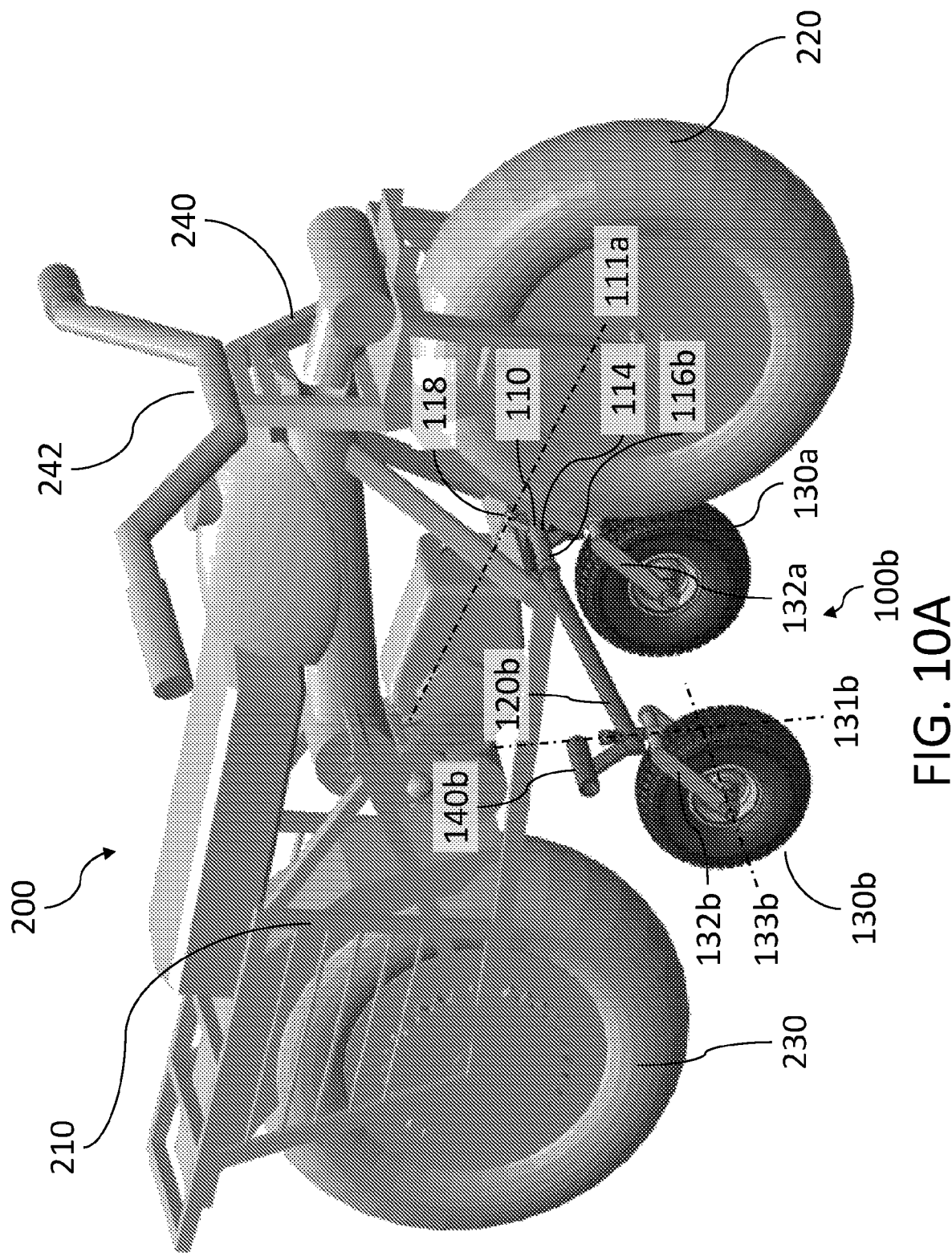
FIG. 10A shows a perspective view of a vehicle with a balance board, according to an alternative implementation of the inventive concepts disclosed herein, wherein the balance board includes multiple pin joints and caster wheels.
Figure 10B:
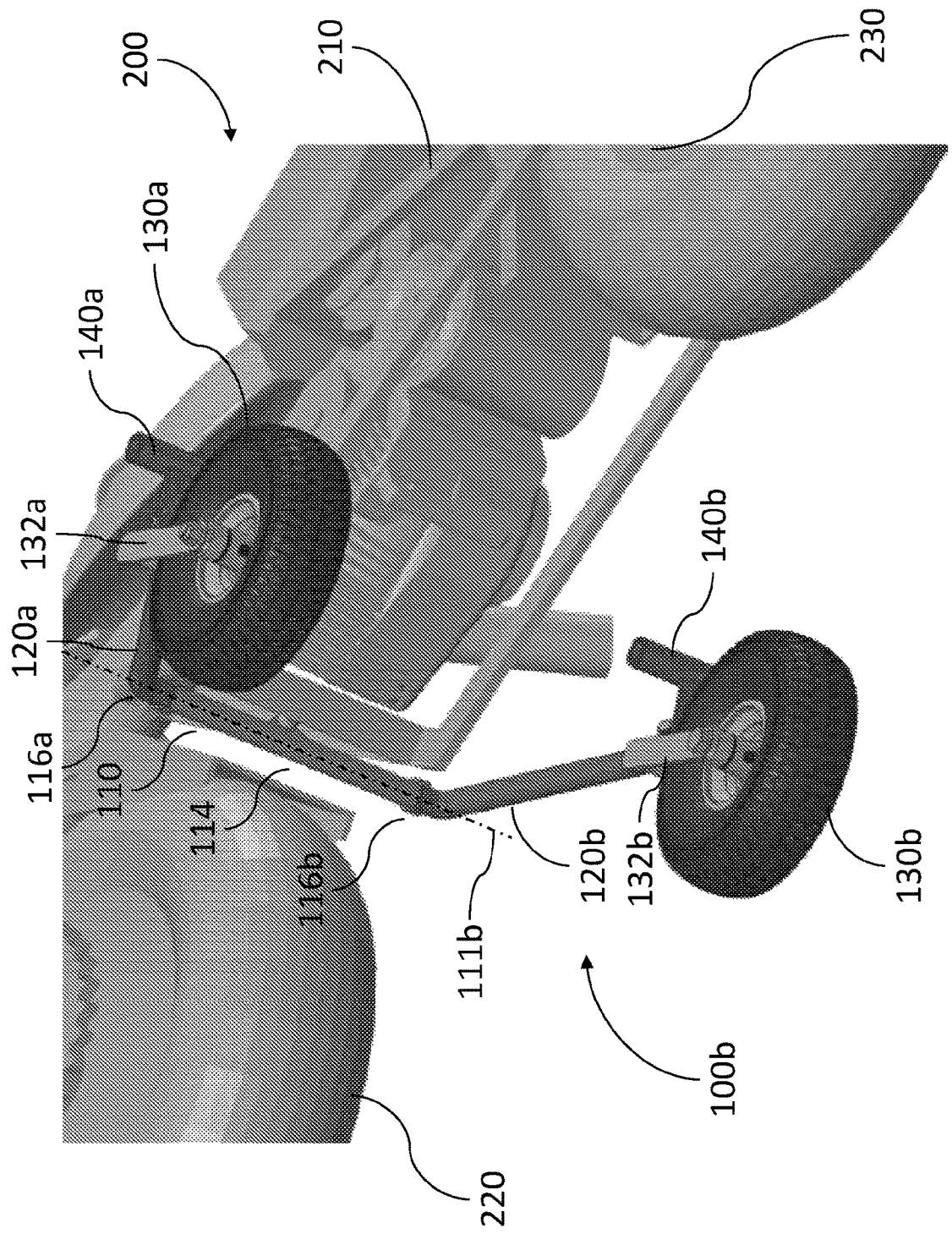
FIG. 10B shows a bottom perspective view of the vehicle of FIG. 10A.
Figure 10C:
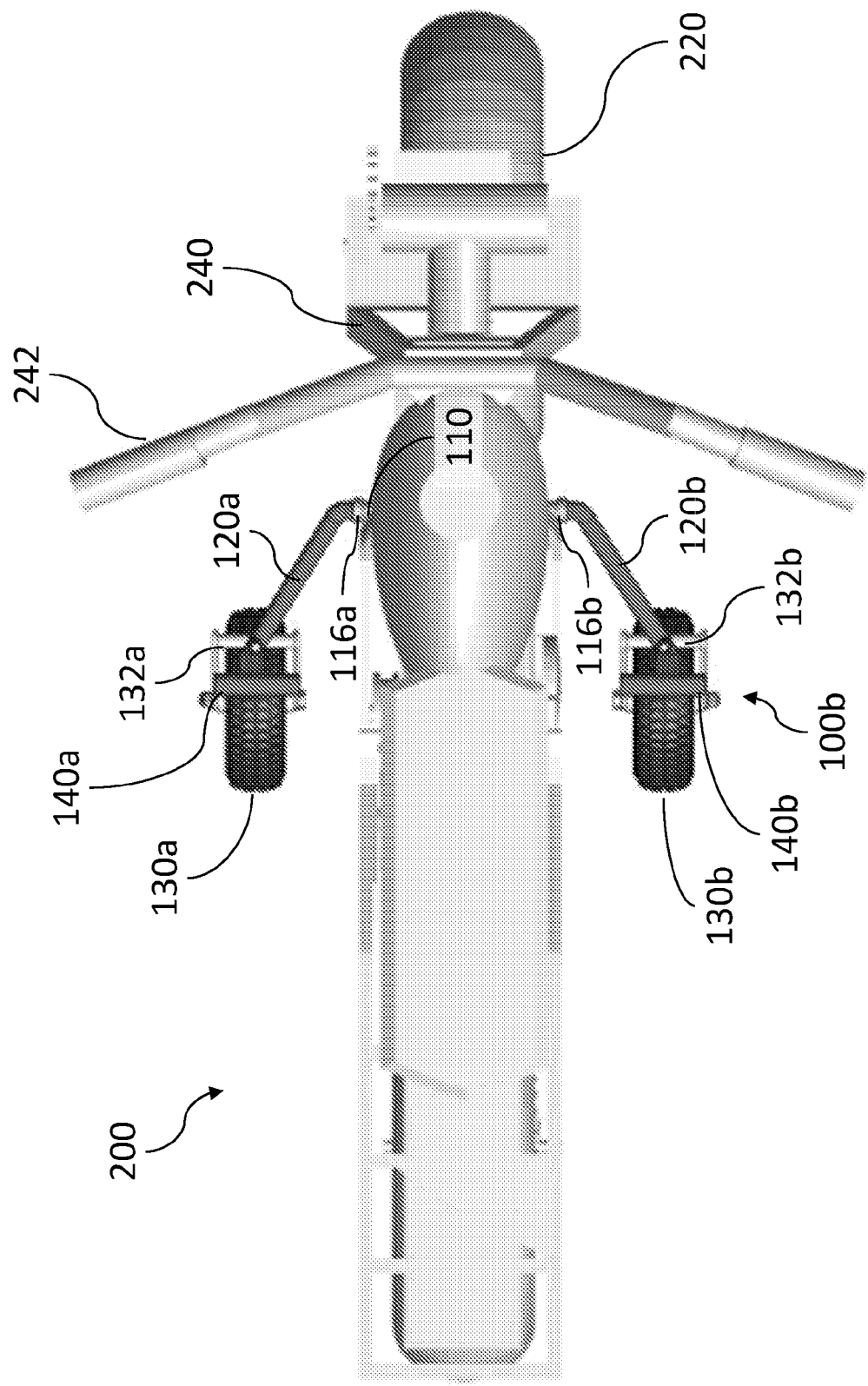
FIG. 10C shows a top view of the vehicle of FIG. 10A.

For example, FIGS. 10A-10C show another exemplary balance board 100b coupled to the vehicle 200 that utilizes a coupling mechanism 110 with a plurality of pin joints (i.e., pin joints 116a, 116b, 118) to provide multiple rotational DOF's between the balance board 100b and the chassis 210 of the vehicle 200. As shown, the balance board 100b may include frames 120a and 120b that are each coupled to the coupling mechanism 110. In this case, the frame 120a may be an arm that supports a wheel 130a and a foot support pedal 140a. Similarly, the frame 120b may be an arm supporting a wheel 130b and a foot support pedal 140b. In this case, the balance board 100b is tailored such that the dimensions j=0 and k is reduced. For reference, the dimensions j and k in FIG. 5C are measured from the balance board steering pivot 131, which is located near the foot pedal 140 in the balance board 100b instead of the coupling mechanism 110 in the balance board 100a.

For the balance board 100b, the coupling mechanism 110 may include a frame 114 that forms a portion of the pin joints 116a and 116b that allow the frames 120a and 120b, respectively, to rotate with respect to the coupling mechanism 110. The pin joints 116a and 116b together define a rotation axis 111b about which the frames 120a and 120b rotate. The frame 114, in turn, may rotate with respect to the vehicle chassis 210 about the pin joint 118, which defines a rotation axis 111a. As shown, the rotation axes 111a and 111b may be orthogonal, thus allowing the balance board 100b to rotate about axes that correspond to a tilt and a roll axis of the vehicle 200.

The wheels 130a and 130b may each be caster wheels, which rotate with respect to the frames 120a and 120b about two axes of rotation (i.e., axes 133b and 131b for the wheel 130b). The wheels 130a and 130b may include forks 132a and 132b, respectively, which define the rotation axes. The wheels 130a and 130b can thus independently steer with respect to the frames 120a and 120b. In this manner, the foot support pedals 140a and 140b may remain parallel with respect to the chassis 210 while the wheels 130a and 130b rotate during, for example, a turn.

In some implementations, the frames 120a and 120b may be rigidly coupled together. Thus, the balance board 100b has four pin joints in total (i.e., two pin joints formed between the wheels 130a and 130b and the frames 120a and 120b, respectively, the coupled pin joints 116a and 116b, and the pin joint 118). In some implementations, the frames 120a and 120b may instead be decoupled such that the frames 120a and 120b rotate independently about the rotation axis 111b. In this case, the balance board 100b has five pin joints in total (i.e., two pin joints formed between the wheels 130a and 130b and the frames 120a and 120b, respectively and the pin joints 116a, 116b, 118).

The balance board 100b exhibits has several advantages and disadvantages compared to the balance board 100a, which will now be discussed.

Durability: The ball hitch connection on the balance board 100a is a simple and common joint. It is also a single joint compared to the at least four joints in the balance board 100b. Additionally, the caster joints in the balance board 100b may be subjected to higher radial forces due to joints transferring a bending moment when the user presses down on the foot pedal 140.

Ground clearance: The balance board 100a may limit the ground clearance of the vehicle 200 for two reasons: (1) the balance board frame 120 rises when the wheels 130 go over tall obstacles and, in turn, hits the motorcycle frame 210, and (2) the inside balance board wheel (e.g., wheel 130a or 130b) may swing under the motorcycle frame 210 during tight turns, which further limits the ground clearance. The balance board 100b, on the other hand, does not change the ground clearance of stock motorcycles when driving straight. Additionally, the caster wheels 130 of the balance board 100b may be dimensioned and positioned such that the wheels 130 are unable to move underneath the motorcycle frame 210. Thus, the ground clearance during a turn may also remain the same as the ground clearance of a stock vehicle.

Reversing: Although motorcycles are typically unable to reverse under their own power, the addition of a reverse drive and/or a reverse gear may become more desirable with the addition of the balance board 100 and the slow speed utility it provides to a motorcycle 200.

The balance board 100a described above may be unstable when the vehicle 200 is reversing. In some implementations, the balance board 100a may behave similar to a trailer towed with a ball hitch. For example, the balance board 100a may swing towards the motorcycle front wheel 220 when the motorcycle 200 is reversing. Since the foot pedals 140 are rigidly coupled to the wheels 130 of the balance board 100a, the foot pedals 140 may also rotate according to the steer angle of the wheels 130, causing the user's feet to also swing with the balance board 100a.

By comparison, the balance board 100b may behave stably in both forward and reverse directions since the caster wheel 130 naturally steers 180 deg when reversing to a new stable position. Since the foot pedals 140 are mechanically decoupled form the caster wheels 130 about the steering axis 131 and are thus independent of the steer angle of the wheels 130 in the balance board 100b, the user's feet may remain in the same position when the vehicle 200 is moving forward or in reverse.

Multi-purposefulness: The balance board 100a has the potential to serve as a small trailer if it is attached behind the rear wheel 230 of the motorcycle 200. For example, the balance board 100a may carry a small water tank. The balance board 100b may be limited for other activities. Nevertheless, the balance boards 100a and 100b may be easy to remove and sufficiently small and/or light to be carried on the motorcycle 200. When the balance board 100 is removed, the motorcycle 200 may operate in the same manner as a stock vehicle.

Turning: During a turn, the wheels 130 for the balance board 100 should reach a steer angle as represented in FIGS. 5B-5D. To achieve the desired steer angle, the balance board 100a should move together with the wheels 130. This motion, in turn, also causes the foot pedals 140 to move with respect to the chassis 210, resulting in the user having to potentially apply more force to the inner foot pedal (e.g., pedal 140a if turning towards wheel 130a) on the inside of the turn to remain upright (see Eqs. 1 and 3) such as during slow, tight turns. As an alternative, the user may remove their inside foot from the foot pedal 140 and press directly against the ground for balance as shown in FIG. 7A.

For the balance board 100b, the wheels 130 may steer independently from the rest of the board 100b. Thus, the user's feet may remain at a constant distance from the chassis 210 irrespective of the steer angle of the wheels 130. This may be advantageous if the user wishes to press on the foot pedal 140 for balance during a turn, but may interfere with the user's foot path if they wish to place their foot directly on the ground for very tight turns (see FIG. 7A). Placing a foot on the ground as the vehicle 200 undergoes a large lean into a slow turn may be desirable since this effectively increases w in Eq. 1, resulting in a lower balance force F. Said in another way, the rider's contact point with the ground may be extended out beyond the balance board 100.

Foot Roll and Leaning: The balance board 100 may remain parallel to the ground irrespective of the motorcycle lean (φ in FIG. 5A). If the vehicle 200 traverses along the side of a slope and the vehicle 200 remains nearly vertical, the user's foot on the downward portion of the slope may move downwards and roll outwards from the chassis 210 while the user's foot on the upward of the slope experiences the opposite motion (see FIG. 9B).

The undesirable foot roll experienced by the user as the vehicle 200 travels along the side of a slope may be reduced by blocking the longitudinal yoke pivot in the balance board 100b such that the arms 120a and 120b are allowed to pivot independently about the yoke axis (rotation axis 111b). In this manner, the foot pedals 140 of the balance board 100b do not roll, but instead remain parallel to the motorcycle rear wheel axle 232 as the motorcycle 200 travels along the side of the slope.

If the balance board 100b is configured in this manner, the balance board 100b may also cause the user's feet to lean with the motorcycle 200 if the chassis 210 leans during a turn. In contrast, the user's foot typically remains parallel to the ground instead of the motorcycle 200 when the user places their foot on the ground for balancing during a tight, slow turn, such as in a conventional motorcycle without the balance board 100. This user's foot similarly remains parallel with respect to the ground in the balance board 100a and the balance board 100b when the pivot motion of the respective arms 120a and 120b are coupled together.

6. A Second Balance Board with Pin Joints

Figure 11A:
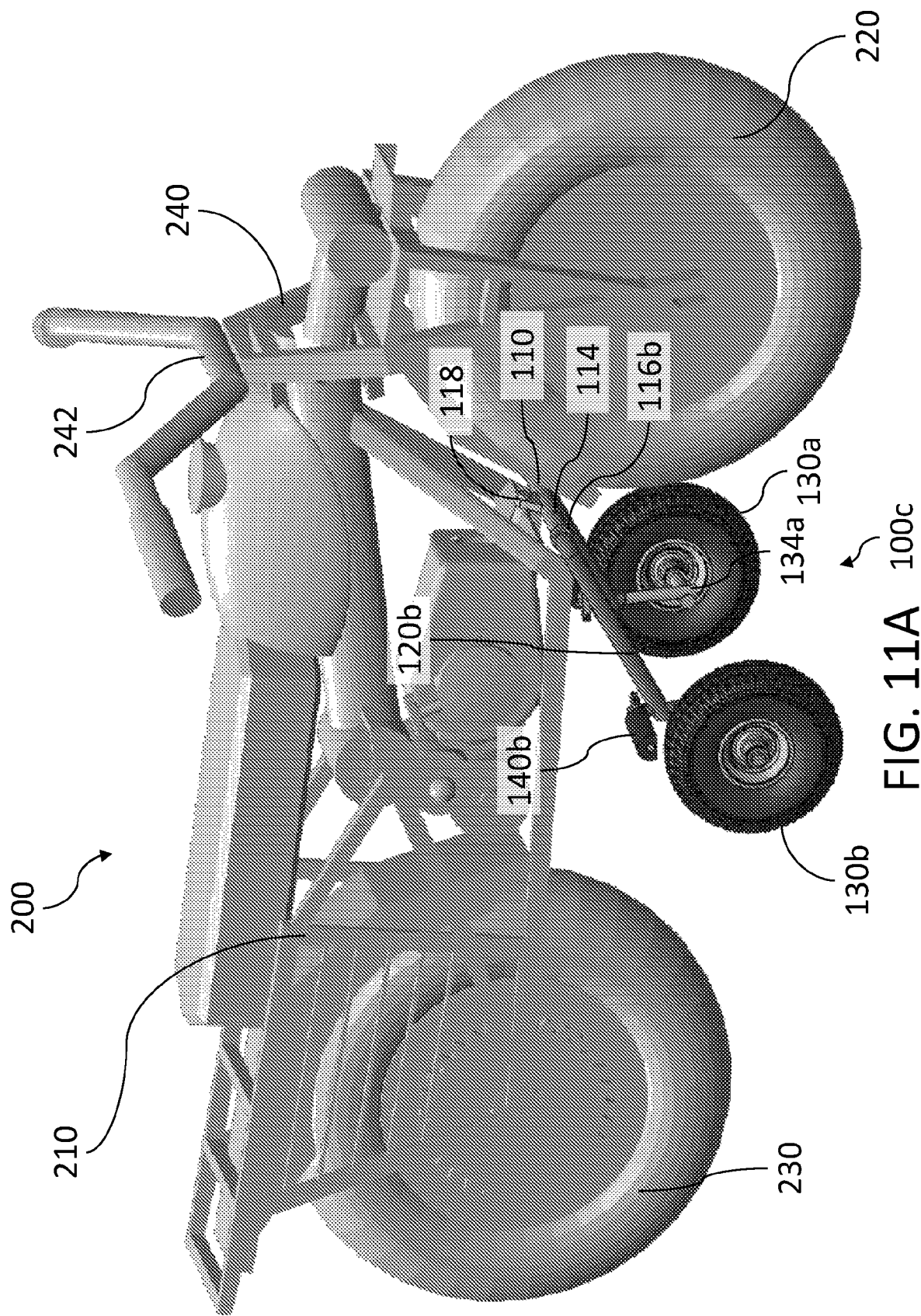
FIG. 11A shows a perspective view of a vehicle with a balance board, according to another alternative implementation of the inventive concepts disclosed herein, wherein the balance board includes multiple pin joints.
Figure 11B:
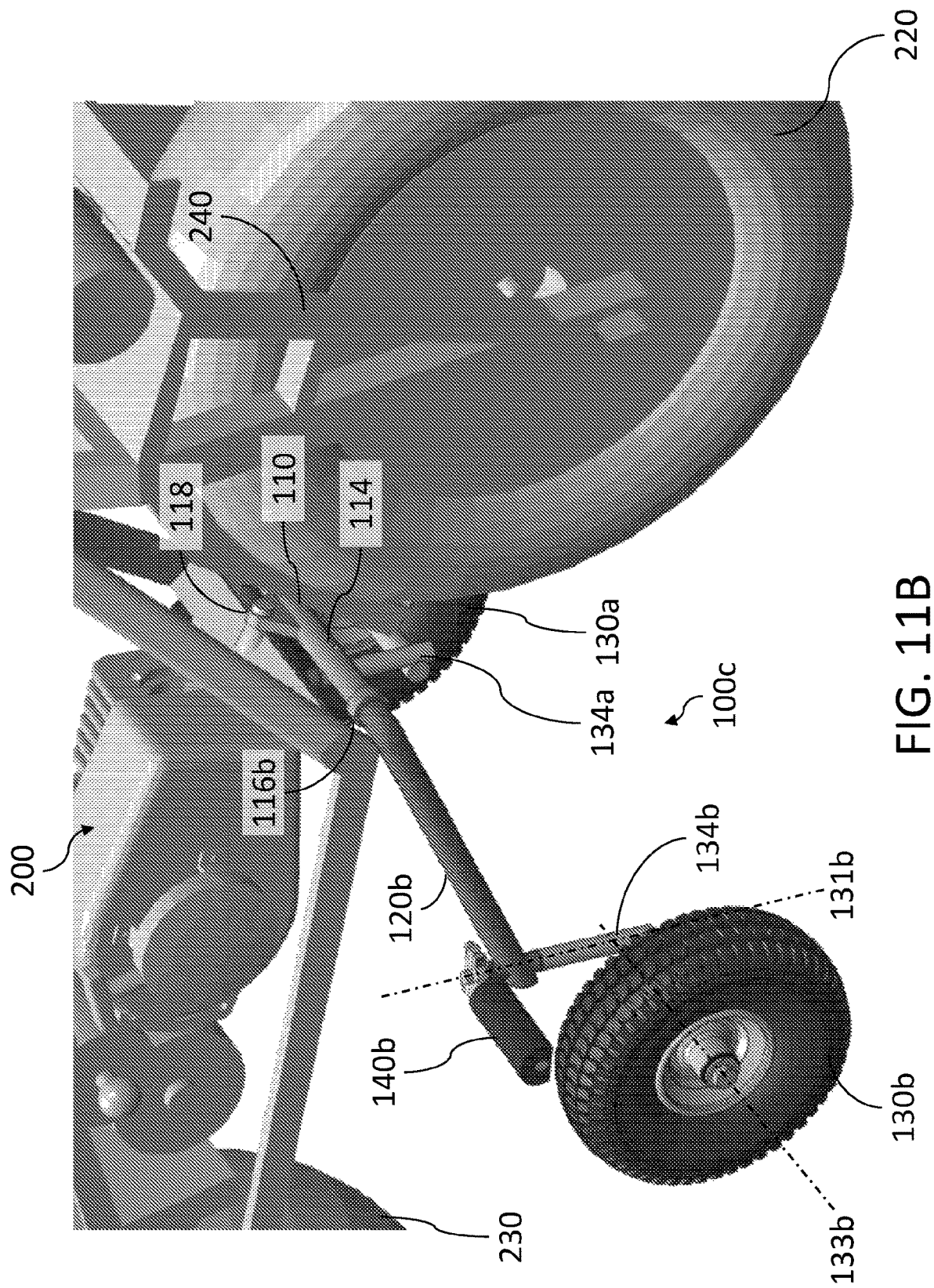
FIG. 11B shows a magnified perspective view of the balance board of FIG. 11A.
Figure 11C:
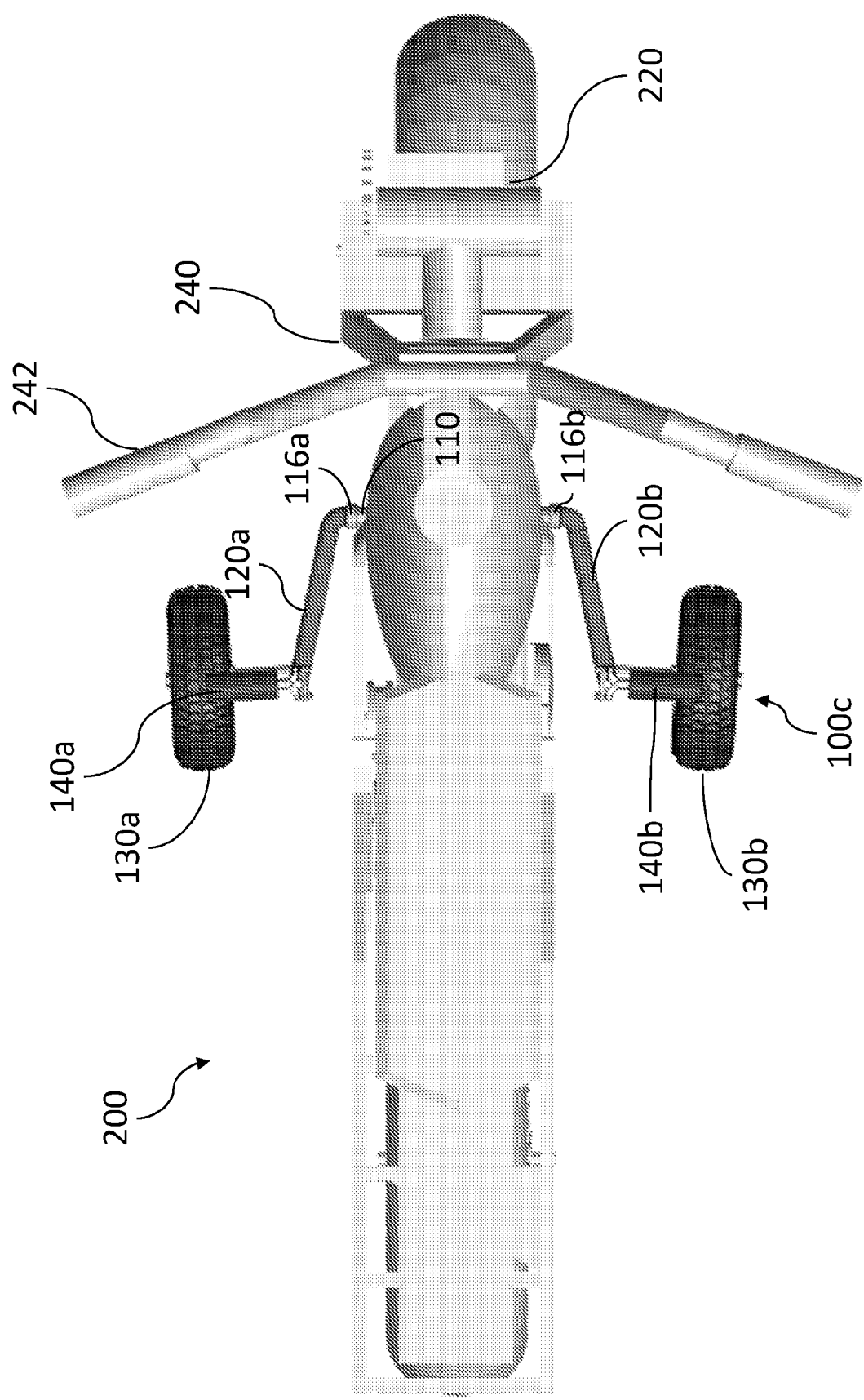
FIG. 11C shows a top view of the vehicle of FIG. 11A.

FIGS. 11A-11C show a vehicle 200 with another exemplary balance board 100c with foot support pedals 140a and 140b rigidly coupled to the wheels 130a and 130b, respectively. As shown, the balance board 100c may include a coupling mechanism 110 and frames 120a and 120b that are substantially similar to the balance board 100b. For instance, the coupling mechanism 110 may include a frame 114 that is coupled to the arms 120a and 120b via pin joints 116a and 116b, respectively. The frame 114 may also be coupled to the chassis 200 via a pin joint 118. The balance board 100c may also include the wheels 130a and 130b, which may rotate with respect to the frames 120a and 120b, respectively, about multiple rotation axes (e.g., a steering axis 131b and a rotation axis 133b for the wheel 130b).

Whereas with the balance board 100b discussed above each foot support pedal stays stationary with a corresponding arm (120a or 120b) of the frame, in the example implementation shown in FIGS. 11A-11C the foot pedals 140a and 140b may turn with the wheels to afford increased control of the caster action. For example, in the balance board 100c, the support pedal 140a may be coupled to the wheel 130a via a support link 134a, which is configured to rotate with respect to the frame 120a about the steering axis 131b. Similarly, the support pedal 140b may be coupled to the wheel 130b via a support link 134b. The foot support pedals 140a and 140b are collectively referred to as the foot support pedal 140. The wheels 130a and 130b are collectively referred to as the wheel 130. The support links 134a and 134b are collectively referred to as the support link 134. The support pedal 140 may thus rotate together with the wheel 130. When the vehicle 200 turns, the wheels 130 may steer, which in turn causes the foot support pedal 140 to turn as well. This may provide the user kinesthetic feedback on the direction of the wheels 130. This configuration may also enable the user to control the direction of the wheels 130 when the vehicle 200, for example, is turning.

In some implementations, the wheels 130a and 130b and, by extension, the foot support pedals 140a and 140b may rotate independently with respect to each other. In some implementations, the wheel 130 may be coupled to the frames 120 using a fork that is substantially similar to the forks 132a and 132b in the balance board 100b instead of the support link 134. In this case, however, the foot support pedal 140 may be coupled to the fork instead of the frames 120 so that the foot support pedal 140 rotates with the wheel 130.

7. A Balance Board with a Wheel and a Ski

Figure 12:
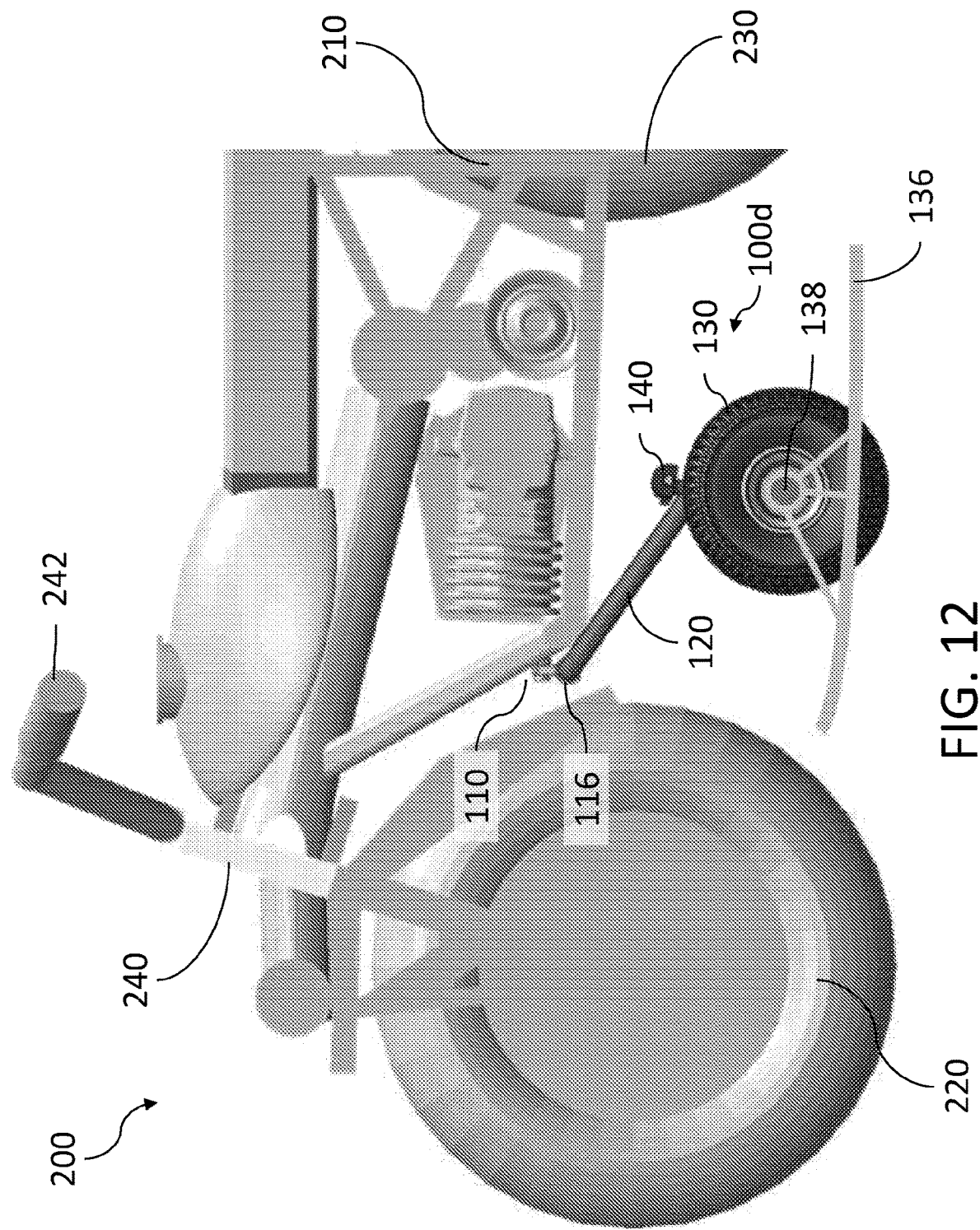
FIG. 12 shows a side view of a vehicle with balance board, according to yet another alternative implementation of the inventive concepts disclosed herein, wherein the balance board includes at least one wheel and a ski.

In some implementations, the balance board 100 may include multiple types of moving elements. For example, FIG. 12 shows a vehicle 200 with an exemplary balance board 100d that includes a wheel 130 and a ski 136. The combination of the wheel 130 and the ski 136 may enable the balance board 100d to traverse both hard and soft terrains. As before, the balance board 100d includes a coupling mechanism 110 (i.e., the coupling mechanism of balance board 100c), a frame 120 coupled to the coupling mechanism 110 via a pin joint 116, and a foot support pedal 140. Although FIG. 12 shows a single wheel 130 and ski 136 disposed on the left side of the vehicle 200, it should be appreciated the balance board 100d may further include another wheel 130 and ski 136 disposed on the right side of the vehicle 200 to enable the user to stabilize the vehicle 200 as it leans to either side.

The wheel 130 and the ski 136 may each be coupled to an axle 138, which in turn is supported by the frame 120. The wheel 130 may rotate about the axle 138 relative to the ski 136 when the vehicle 200 is moving. In some implementations, the ski 136 may also rotate about the axle 138 in order to accommodate uneven or sloped terrain (e.g., when the vehicle 200 is traveling up or down a slope).

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A vehicle to be operated by a user, the vehicle comprising:
 a chassis;
 a front wheel rotatably coupled to the chassis to facilitate movement of the vehicle over a ground surface;
 a rear wheel rotatably coupled to the chassis to further facilitate the movement of the vehicle over the ground surface; and
 a balance board disposed between the front wheel and the rear wheel and coupled to the chassis such that the balance board maintains contact with the ground surface, without an applied force to the balance board by the user, when the chassis rotates with respect to the ground surface about a longitudinal axis of the vehicle, the balance board comprising:
  a coupling mechanism that couples the balance board to the chassis such that the balance board is rotatable with respect to the chassis about a plurality of orthogonal rotation axes; and at least one of a first foot support assembly coupled to the coupling mechanism or a second foot support assembly coupled to the coupling mechanism, wherein at least one of the first foot support assembly and the second foot support assembly is configured to rotate in response to a change in a steering angle of the balance board.

2. The vehicle of claim 1, wherein the plurality of orthogonal rotation axes includes at least three rotation axes.

3. The vehicle of claim 2, wherein the at least three rotation axes are substantially orthogonal with respect to one another.

4. The vehicle of claim 1, wherein the balance board is coupled to the chassis via a ball joint or a plurality of pin joints.

5. The vehicle of claim 1, further comprising:
a pair of handlebars, rotatably coupled to the chassis, to steer the front wheel,
wherein a first width of the balance board is less than or equal to a second width of the pair of handlebars.

6. The vehicle of claim 1, wherein the balance board comprises at least one of a wheel or a ski that physically contacts the ground surface.

7. The vehicle of claim 1, wherein the balance board further comprises:
at least one frame coupled to the coupling mechanism,
wherein the first foot support assembly comprises:
a first foot support pedal coupled to the at least one frame; and
a first wheel, rotatably coupled to the at least one frame, that physically contacts the ground; and
wherein the second foot support assembly comprises:
a second foot support pedal coupled to the at least one frame; and
a second wheel, rotatably coupled to the at least one frame, that physically contacts the ground.

8. The vehicle of claim 7, wherein a lateral distance, w, from a center of the first wheel to the longitudinal axis of the vehicle is described by a relation:

$$w = h + \sqrt{j^2 + k^2} \sin\left(\tan^{-1}\left(\frac{k}{j}\right) - \alpha\right)$$

wherein:
α is the steering angle of the first wheel, h is a first lateral distance from the longitudinal axis to a steering axis of the first wheel, j is a second lateral distance from the steering axis to the first wheel when α is equal to zero, and k is a longitudinal distance from the steering axis to the first wheel when α is zero; and
the values of α, j, and k are chosen such that w is substantially constant when the vehicle turns.

9. The vehicle of claim 1, wherein the balance board is coupled to the chassis at a location proximate to an axle of the rear wheel.

10. A vehicle, comprising:
a chassis;
a front wheel rotatably coupled to the chassis to facilitate movement of the vehicle over a ground surface;
a rear wheel rotatably coupled to the chassis to further facilitate the movement of the vehicle over the ground surface;
a balance board disposed between the front wheel and the rear wheel and coupled to the chassis, the balance board comprising at least one moving element that physically contacts the ground surface, the at least one moving element rotating substantially independently with respect to the chassis about a steering axis when the vehicle turns; and
at least one of a first foot support assembly or a second foot support assembly, the at least one of the first foot support assembly or the second foot support assembly being disposed above the at least one moving element that physically contacts the ground surface such that an axis passing through the at least one element that is transverse to the ground surface passes through the at least one of the first foot support assembly or the second foot support assembly.

11. The vehicle of claim 10, wherein the at least one moving element is at least one of a wheel or a ski.

12. The vehicle of claim 10, wherein the balance board further comprises:
a coupling mechanism to couple the balance board to the chassis;
a frame, coupled to the coupling mechanism, supporting the at least one moving element; and
a foot support pedal coupled to the frame.

13. The vehicle of claim 12, wherein:
the steering axis is defined by the coupling mechanism; and
the at least one moving element is rigidly coupled to the frame such that the at least one moving element, the frame, the foot support pedal, and the coupling mechanism rotate together with respect to the chassis about the steering axis.

14. The vehicle of claim 12, wherein:
the steering axis is defined by the at least one moving element; and
the at least one moving element is rotatably coupled to the frame such that the at least one moving element rotates with respect to the foot support pedal about the steering axis when the vehicle turns.

15. The vehicle of claim 10, wherein the balance board does not limit a ground clearance of the vehicle.

16. The vehicle of claim 10, further comprising:
a pair of handlebars, rotatably coupled to the chassis, to steer the front wheel,
wherein a first width of the balance board is less than or equal to a second width of the pair of handlebars.

17. The vehicle of claim 10, wherein the at least one moving element includes a first moving element and a second moving element, and wherein the balance board further comprises:
a coupling mechanism that couples the balance board to the chassis such that the balance board is rotatable with respect to the chassis about a plurality of orthogonal rotation axes;
a first foot support assembly coupled to the coupling mechanism, the first foot support assembly comprising:
a first frame coupled to the coupling mechanism;
a first foot support pedal coupled to the first frame; and
the first moving element coupled to the first frame; and
a second foot support assembly coupled to the coupling mechanism, the second foot support assembly comprising:
a second frame coupled to the coupling mechanism;
a second foot support pedal coupled to the second frame; and a second moving element, coupled to the second frame, that physically contacts the ground surface and rotates substantially independently with respect to the chassis when the vehicle turns.

18. The vehicle of claim 17, wherein the second moving element rotates independently with respect to the first moving element about at least two rotation axes.

19. A balance board, comprising:
a coupling mechanism to couple the balance board to a chassis of a vehicle;
at least one frame coupled to the coupling mechanism;
a first foot support assembly coupled to the coupling mechanism, the first foot support assembly comprising:
a first foot support pedal coupled to the at least one frame; and
a first moving element, coupled to the at least one frame, that physically contacts a ground surface supporting the balance board; and
a second foot support assembly coupled to the coupling mechanism, the second foot support assembly comprising:
a second foot support pedal coupled to the at least one frame; and
a second moving element, coupled to the at least one frame, that physically contacts the ground surface,
wherein:
the balance board is shaped and dimensioned to fit below the chassis and disposed between a front wheel and a rear wheel of the vehicle; and
a width of the balance board is less than about 0.5 m.

20. The balance board of claim 19, wherein the coupling mechanism comprises a portion of at least one of a ball joint or a plurality of pin joints.

21. The balance board of claim 19, wherein the first foot support assembly is rotatable about a first rotation axis defined by the coupling mechanism and the second foot support assembly is rotatable about the first rotation axis independently of the first wheel assembly.

22. The balance board of claim 19, wherein:
the first foot pedal support is rigidly coupled to the first frame; and
the first moving element is rotatable with respect to the first foot support pedal about two rotation axes defined by the first moving element.

23. The balance board of claim 19 in combination with the vehicle, the vehicle comprising:
a chassis;
a front wheel coupled to the chassis; and
a rear wheel coupled to the chassis,
wherein the balance board is coupled to the chassis and disposed between the front wheel and the rear wheel.

24. The combination of claim 23, wherein the first foot support assembly is coupled to the second foot support assembly such that the first foot support assembly and the second foot support assembly rotate together with respect to the chassis via the coupling mechanism.

25. The vehicle of claim 6, wherein at least one of the first foot support assembly and the second foot support assembly remain substantially parallel to an axle of the at least one wheel when the wheel rotates with respect to the frame that couples the first foot support assembly and the second foot support assembly to the chassis.

* * * * *